(12) United States Patent
Hang et al.

(10) Patent No.: US 10,284,411 B2
(45) Date of Patent: May 7, 2019

(54) SIGNAL PROCESSING METHOD AND APPARATUS

(71) Applicant: Huawei Technologies Co., Ltd., Shenzhen, Guangdong (CN)

(72) Inventors: Haicun Hang, Shanghai (CN); Ye Wu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 156 days.

(21) Appl. No.: 15/264,330

(22) Filed: Sep. 13, 2016

(65) Prior Publication Data

US 2017/0005849 A1    Jan. 5, 2017

Related U.S. Application Data

(63) Continuation of application No. PCT/CN2014/092245, filed on Nov. 26, 2014.

(30) Foreign Application Priority Data

Mar. 14, 2014    (CN) .......................... 2014 1 0095408

(51) Int. Cl.
*H04L 27/26* (2006.01)
*H04L 25/02* (2006.01)
(Continued)

(52) U.S. Cl.
CPC ...... *H04L 27/2688* (2013.01); *H04J 11/0023* (2013.01); *H04L 25/022* (2013.01);
(Continued)

(58) Field of Classification Search
None
See application file for complete search history.

(56) References Cited

U.S. PATENT DOCUMENTS

2003/0043927 A1*   3/2003   Suzuki ............... H04L 27/2628
                                                                   375/260
2003/0185310 A1   10/2003   Ketchum et al.
(Continued)

FOREIGN PATENT DOCUMENTS

| CN | 101485122 A | 7/2009 |
|---|---|---|
| CN | 101557377 A | 10/2009 |
| CN | 101789810 A | 7/2010 |
| CN | 101867549 A | 10/2010 |
| CN | 102255844 A | 11/2011 |
| CN | 102497350 A | 6/2012 |
| CN | 102957659 A | 3/2013 |

(Continued)

*Primary Examiner* — Jamaal R Henson

(57) ABSTRACT

The present invention discloses a signal processing method and apparatus, and pertains to the field of communications technologies. The apparatus includes: a processor and a memory. The method includes: setting each sampling point signal on an orthogonal frequency division multiplexing OFDM symbol, and obtaining an input signal; calculating a constraint matrix according to a frequency selective fading channel characteristic; and calculating an output signal according to the sampling point signal, the input signal, and the constraint matrix. The present invention resolves a problem that frequency selective fading has an impact on transmission of the OFDM symbol, and a constraint matrix obtained according to a flat fading channel characteristic is not applicable to the OFDM symbol, thereby achieving an effect of reducing the impact of the frequency selective fading on the transmission of the OFDM symbol.

10 Claims, 4 Drawing Sheets

(51) Int. Cl.
*H04J 11/00* (2006.01)
*H04L 12/801* (2013.01)
*H04W 16/22* (2009.01)
*H04L 25/03* (2006.01)
*H04W 88/02* (2009.01)
*H04W 88/08* (2009.01)

(52) U.S. Cl.
CPC .... *H04L 25/0242* (2013.01); *H04L 25/03343* (2013.01); *H04L 27/265* (2013.01); *H04L 27/2623* (2013.01); *H04L 27/2626* (2013.01); *H04L 47/29* (2013.01); *H04W 16/22* (2013.01); *H04W 88/02* (2013.01); *H04W 88/08* (2013.01)

(56) References Cited

U.S. PATENT DOCUMENTS

| | | | |
|---|---|---|---|
| 2003/0235255 A1* | 12/2003 | Ketchum | H04B 7/0417 375/285 |
| 2007/0230596 A1* | 10/2007 | Veen | H04L 27/2614 375/260 |
| 2007/0254592 A1 | 11/2007 | McCallister et al. | |
| 2010/0215081 A1* | 8/2010 | Bajwa | H04B 1/711 375/147 |
| 2012/0020437 A1* | 1/2012 | Furudate | H04L 25/0204 375/316 |

FOREIGN PATENT DOCUMENTS

| | | |
|---|---|---|
| CN | 103199963 A | 7/2013 |
| WO | 2008111810 A1 | 9/2008 |

* cited by examiner

SIGNAL PROCESSING METHOD AND APPARATUS

CROSS-REFERENCE TO RELATED APPLICATIONS

This application is a continuation of International Application No. PCT/CN2014/092245, filed on Nov. 26, 2014, which claims priority to Chinese Patent Application No. 201410095408.1, filed on Mar. 14, 2014, both of which are hereby incorporated by reference in their entireties.

TECHNICAL FIELD

The present invention relates to the field of communications technologies, and in particular, to a signal processing method and apparatus.

BACKGROUND

A MIMO (Multiple-Input Multiple-Output, multiple-input multiple-output) system is a system that allows multiple antennas to send and receive signals at the same time; because there are many antennas in the MIMO system, all the antennas in the MIMO system use a power amplifier with relatively low power, and the MIMO system is widely applied nowadays as an increasingly high requirement is imposed on an energy-saving indicator. When a signal is transmitted by using the MIMO system, a transmit end needs to preprocess an input signal, so as to reduce an impact of multipath fading on the signal. The multipath fading refers to a phenomenon that, being affected by terrestrial and atmospheric refraction in a transmission process, a signal arrives at a receive end through multiple different paths; and includes flat fading and frequency selective fading. A flat fading channel has a basically same impact on amplitudes and phases of signals with different frequencies, and a frequency selective fading channel has different impacts on amplitudes and phases of signals with different frequencies.

Preprocessing the input signal by the transmit end includes precoding, RE (Resource Element, resource element) mapping, and IFFT (Inverse Fast Fourier Transform, inverse fast Fourier transform). The precoding refers to preprocessing a frequency-domain signal in a case in which channel state information is known, so as to reduce interference. The RE mapping refers to mapping a frequency-domain signal on a subcarrier to a corresponding subcarrier in a physical resource block. The IFFT refers to transforming a frequency-domain signal into a time-domain signal.

Specifically, the transmit end performs time sampling on the input signal, and obtains one time sampling point from each antenna; calculates a constraint matrix according to a flat fading channel characteristic; presets a predetermined quantity of iteration times required for calculating an output signal, and initializes the output signal to 0; calculates an intermediate variable, and performs a peak clipping operation on an obtained intermediate variable; detects whether a current quantity of iteration times reaches the predetermined quantity of iteration times; and if the current quantity of iteration times does not reach the predetermined quantity of iteration times, uses an intermediate variable obtained after the peak clipping operation as an input signal for a next time of iteration; or if the current quantity of iteration times reaches the predetermined quantity of iteration times, determines an intermediate variable obtained after the peak clipping operation as the output signal. The output signal is obtained according to the constraint matrix and the peak clipping operation; therefore, a PAR (Peak to Average Ratio, peak-to-average ratio) of the output signal is relatively small, that is, an instantaneous value of the output signal is within a linear working area of an amplifier, which avoids non-linear distortion of the signal caused when the instantaneous value is beyond the linear working area.

In a process of implementing the present invention, the inventors find that at least the following disadvantage exists in the prior art:

A constraint matrix in the prior art is calculated according to a flat fading channel characteristic, but a broadband system using an OFDM (Orthogonal Frequency Division Multiplexing, orthogonal frequency division multiplexing) technology is affected by frequency selective fading; therefore, the prior constraint matrix is not applicable to an OFDM symbol, and the OFDM symbol cannot be preprocessed. The OFDM is a multi-carrier modulation scheme in which a carrier can be divided into several orthogonal subcarriers, a high-speed serial data stream is converted into low-speed parallel sub-data streams, and the low-speed parallel sub-data streams are modulated to each of the subcarriers for transmission, where each OFDM symbol includes at least one modulated subcarrier.

SUMMARY

To resolve a problem that frequency selective fading affects transmission of an OFDM symbol, and a constraint matrix obtained according to a flat fading channel characteristic is not applicable to the OFDM symbol, embodiments of the present invention provide a signal processing method and apparatus. The technical solutions are as follows:

According to a first aspect, an embodiment of the present invention provides a signal processing apparatus, where the apparatus includes: a processor and a memory, the memory stores a computer program, and the processor performs the following operations by accessing the computer program:

the processor is configured to: set each sampling point signal on an orthogonal frequency division multiplexing OFDM symbol, and obtain an input signal;

the processor is further configured to calculate a constraint matrix according to a frequency selective fading channel characteristic; and the processor is further configured to calculate an output signal according to the sampling point signal, the input signal, and the constraint matrix.

In a first possible implementation manner of the first aspect, the processor is specifically configured to: when the input signal is corresponding to all subcarriers in the OFDM symbol, set a channel matrix H to a diagonal matrix according to the frequency selective fading channel characteristic, determine a confederate matrix F used to perform resource element RE mapping and frequency-time domain transformation, and multiply the channel matrix H by the confederate matrix F to obtain the constraint matrix; or the processor is specifically configured to: when the input signal is corresponding to one subcarrier in the OFDM symbol, set a channel matrix H to a diagonal matrix according to the frequency selective fading channel characteristic, and determine the channel matrix H as the constraint matrix.

With reference to the first possible implementation manner of the first aspect, in a second possible implementation manner of the first aspect, the processor is specifically configured to: obtain an operation matrix used to perform frequency-time domain transformation; and rearrange, according to a mapping sequence of RE mapping, operation factors in an operation element of the operation matrix to obtain the confederate matrix F.

With reference to the first possible implementation manner of the first aspect or the second possible implementation manner of the first aspect, in a third possible implementation manner of the first aspect, the channel matrix $$H = \begin{bmatrix} H_0 & & & \\ & H_1 & & \\ & & \ddots & \\ & & & H_{W-1} \end{bmatrix},$$

where $H_{W-1}$ is a channel matrix on the $w^{th}$ subcarrier, and w is a total quantity of subcarriers;

the confederate matrix $$F = \begin{bmatrix} F_{0,0} & F_{0,1} & \cdots & F_{0,W-1} \\ F_{1,0} & F_{1,1} & \cdots & F_{1,W-1} \\ \vdots & \vdots & \ddots & \vdots \\ F_{W-1,0} & F_{W-1,1} & \cdots & F_{W-1,W-1} \end{bmatrix}; \text{ and}$$

$$F_{m,n} = \frac{N_{\!f\!f\!t}}{\sqrt{W}} \begin{bmatrix} W_{N_m}^{m,n} & & & \\ & W_{N_m}^{m,n} & & \\ & & \ddots & \\ & & & W_{N_m}^{m,n} \end{bmatrix},$$

and $W_{N_{\!f\!f\!t}}^{m,n} = (e^{-2\pi i/(W-1)})^{m*n}$; where $F_{m,n}$ is an operation element of the $m^{th}$ user antenna on the $n^{th}$ base station transmit antenna, $W_N^{m,n}$ is an operation factor of $F_{m,n}$, $N_{\!f\!f\!t}$ is a quantity of points of fast Fourier transform FFT, where $0 \leq n \leq M-1$, M is a total quantity of user antennas, $0 \leq n \leq N-1$, and N is a total quantity of base station transmit antennas.

With reference to the first aspect, or the first possible implementation manner of the first aspect, or the second possible implementation manner of the first aspect, or the third possible implementation manner of the first aspect, in a fourth possible implementation manner of the first aspect, the processor is specifically configured to calculate the sampling point signal, the input signal, and the constraint matrix to obtain a first intermediate variable;

the processor is specifically configured to: calculate a peak-to-average ratio PAR threshold of a peak clipping operation according to the first intermediate variable, and calculate a second intermediate variable according to the threshold; and the processor is specifically configured to: when a current quantity of iteration times does not reach a preset iteration threshold, calculate a third intermediate variable according to the second intermediate variable, determine the third intermediate variable as the sampling point signal, and re-perform the operation of calculating the sampling point signal, the input signal, and the constraint matrix to obtain a first intermediate variable; or the processor is specifically configured to: when a current quantity of iteration times reaches a preset iteration threshold and the input signal is corresponding to all the subcarriers in the OFDM symbol, determine the second intermediate variable as the output signal; or the processor is specifically configured to: when a current quantity of iteration times reaches a preset iteration threshold and the input signal is corresponding to one subcarrier in the OFDM symbol, perform RE mapping and frequency-time domain transformation on the second intermediate variable to obtain the output signal.

With reference to the fourth possible implementation manner of the first aspect, in a fifth possible implementation manner of the first aspect, the processor is specifically configured to: arrange the second intermediate variable according to a mapping sequence of RE mapping; and multiply an arranged second intermediate variable by the operation matrix used to perform frequency-time domain transformation, to obtain the output signal.

According to a second aspect, an embodiment of the present invention provides a signal processing method, where the method includes:

setting each sampling point signal on an orthogonal frequency division multiplexing OFDM symbol, and obtaining an input signal;

calculating a constraint matrix according to a frequency selective fading channel characteristic; and calculating an output signal according to the sampling point signal, the input signal, and the constraint matrix.

In a first possible implementation manner of the second aspect, the calculating a constraint matrix according to a frequency selective fading channel characteristic includes:

if the input signal is corresponding to all subcarriers in the OFDM symbol, setting a channel matrix H to a diagonal matrix according to the frequency selective fading channel characteristic, determining a confederate matrix F used to perform resource element RE mapping and frequency-time domain transformation, and multiplying the channel matrix H by the confederate matrix F to obtain the constraint matrix; or if the input signal is corresponding to one subcarrier in the OFDM symbol, setting a channel matrix H to a diagonal matrix according to the frequency selective fading channel characteristic, and determining the channel matrix H as the constraint matrix.

With reference to the first possible implementation manner of the second aspect, in a second possible implementation manner of the second aspect, the determining a confederate matrix F used to perform resource element RE mapping and frequency-time domain transformation includes:

obtaining an operation matrix used to perform frequency-time domain transformation; and rearranging, according to a mapping sequence of RE mapping, operation factors in an operation element of the operation matrix to obtain the confederate matrix F.

With reference to the first possible implementation manner of second aspect or the second possible implementation manner of second aspect, in a third possible implementation manner of the second aspect, the channel matrix $$H = \begin{bmatrix} H_0 & & & \\ & H_1 & & \\ & & \ddots & \\ & & & H_{W-1} \end{bmatrix},$$

where $H_{W-1}$ is a channel matrix on the $w^{th}$ subcarrier, and w is a total quantity of subcarriers;

the confederate matrix $$F = \begin{bmatrix} F_{0,0} & F_{0,1} & \cdots & F_{0,W-1} \\ F_{1,0} & F_{1,1} & \cdots & F_{1,W-1} \\ \vdots & \vdots & \ddots & \vdots \\ F_{W-1,0} & F_{W-1,1} & \cdots & F_{W-1,W-1} \end{bmatrix}; \text{ and}$$

$$F_{m,n} = \frac{N_{fft}}{\sqrt{W}} \begin{bmatrix} W_{N_m}^{m,n} & & & \\ & W_{N_m}^{m,n} & & \\ & & \ddots & \\ & & & W_{N_m}^{m,n} \end{bmatrix},$$

and $W_{N_{fft}}^{m,n} = (e^{-2\pi i/(W-1)})^{m*n}$; where $F_{m,n}$ is an operation element of the $m^{th}$ user antenna on the $n^{th}$ base station transmit antenna, $W_{N_{fft}}^{m,n}$ is an operation factor of $F_{m,n}$, $N_{fft}$ s a quantity of points of fast Fourier transform FFT, where $0 \leq m \leq M-1$, M is a total quantity of user antennas, $0 \leq n \leq N-1$, and N is a total quantity of base station transmit antennas.

With reference to the second aspect, or the first possible implementation manner of the second aspect, or the second possible implementation manner of the second aspect, or the third possible implementation manner of the second aspect, in a fourth possible implementation manner of the second aspect, the calculating an output signal according to the sampling point signal, the input signal, and the constraint matrix includes:

calculating the sampling point signal, the input signal, and the constraint matrix to obtain a first intermediate variable;

calculating a peak-to-average ratio PAR threshold of a peak clipping operation according to the first intermediate variable, and calculating a second intermediate variable according to the threshold; and if a current quantity of iteration times does not reach a preset iteration threshold, calculating a third intermediate variable according to the second intermediate variable, determining the third intermediate variable as the sampling point signal, and re-performing the step of calculating the sampling point signal, the input signal, and the constraint matrix to obtain a first intermediate variable; or if a current quantity of iteration times reaches a preset iteration threshold and the input signal is corresponding to all the subcarriers in the OFDM symbol, determining the second intermediate variable as the output signal; or if a current quantity of iteration times reaches a preset iteration threshold and the input signal is corresponding to one subcarrier in the OFDM symbol, performing RE mapping and frequency-time domain transformation on the second intermediate variable to obtain the output signal.

With reference to the fourth possible implementation manner of the second aspect, in a fifth possible implementation manner of the second aspect, the performing RE mapping and frequency-time domain transformation on the second intermediate variable to obtain the output signal includes:

arranging the second intermediate variable according to a mapping sequence of RE mapping; and multiplying an arranged second intermediate variable by the operation matrix used to perform frequency-time domain transformation, to obtain the output signal.

Each sampling point signal on an OFDM symbol is set, and an input signal is obtained; a constraint matrix is calculated according to a frequency selective fading channel characteristic; and an output signal is calculated according to the sampling point signal, the input signal, and the constraint matrix; the output signal can be obtained after the input signal is preprocessed according to the frequency selective fading channel characteristic, so that frequency selective fading has a smaller impact on transmission of an OFDM symbol obtained according to the output signal, which resolves a problem that a constraint matrix obtained according to a flat fading channel characteristic is not applicable to the OFDM symbol, thereby achieving an effect of reducing the impact of the frequency selective fading on the transmission of the OFDM symbol.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION

To make the objectives, technical solutions, and advantages of the present invention clearer, the following further describes the embodiments of the present invention in detail with reference to the accompanying drawings.

Figure 1:
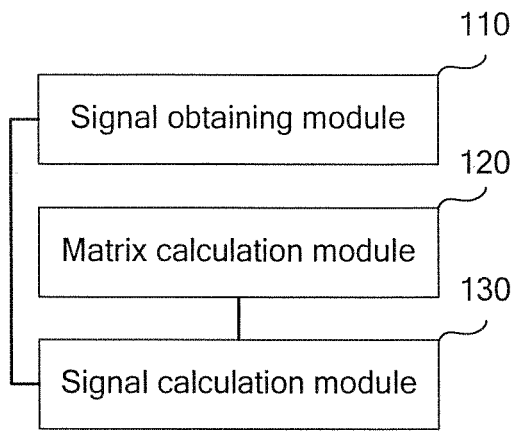
FIG. 1 is a structural block diagram of a signal processing apparatus according to an embodiment of the present invention.

Referring to FIG. 1, FIG. 1 shows a structural block diagram of a signal processing apparatus according to an embodiment of the present invention. The signal processing apparatus includes: a signal obtaining module 110, a matrix calculation module 120, and a signal calculation module 130.

The signal obtaining module 110 is configured to: set each sampling point signal on an OFDM symbol, and obtain an input signal.

For each OFDM symbol, a transmit end performs sampling on the OFDM symbol according to a preset sampling period, so as to obtain each sampling point. In this embodiment, the transmit end further needs to initialize each sampling point, that is, set a time-domain signal at each sampling point to 0 to obtain a sampling point signal.

The transmit end may further obtain an input modulation symbol, and determine the modulation symbol as the input signal.

The matrix calculation module 120 is configured to calculate a constraint matrix according to a frequency selective fading channel characteristic.

The constraint matrix in this embodiment is a matrix used to preprocess the input signal. Because frequency selective fading has a larger impact on the OFDM symbol in a transmission process, signals that are on some frequency and are received by a receive end are enhanced, and signals on some frequency are weakened, which causes severe interference between OFDM symbols. Therefore, the transmit end can calculate a proper constraint matrix according to the frequency selective fading channel characteristic, and reduce the interference between the OFDM symbols by using the constraint matrix.

The signal calculation module 130 is configured to calculate an output signal according to the sampling point signal and the input signal that are obtained by the signal obtaining module 110 and according to the constraint matrix obtained through calculation by the matrix calculation module 120.

The transmit end calculates the output signal according to the sampling point signal, the input signal, and the constraint matrix, further adds a CP (Cyclic Prefix, cyclic prefix) to the output signal to form an OFDM time-domain signal, and sends the OFDM time-domain signal.

In conclusion, the signal processing apparatus provided in this embodiment of the present invention sets each sampling point signal on an OFDM symbol, and obtains an input signal; calculates a constraint matrix according to a frequency selective fading channel characteristic; calculates an output signal according to the sampling point signal, the input signal, and the constraint matrix; and can obtain the output signal after preprocessing the input signal according to the frequency selective fading channel characteristic, so that frequency selective fading has a smaller impact on transmission of an OFDM symbol obtained according to the output signal, which resolves a problem that a constraint matrix obtained according to a flat fading channel characteristic is not applicable to the OFDM symbol, thereby achieving an effect of reducing the impact of the frequency selective fading on the transmission of the OFDM symbol.

Figure 2:
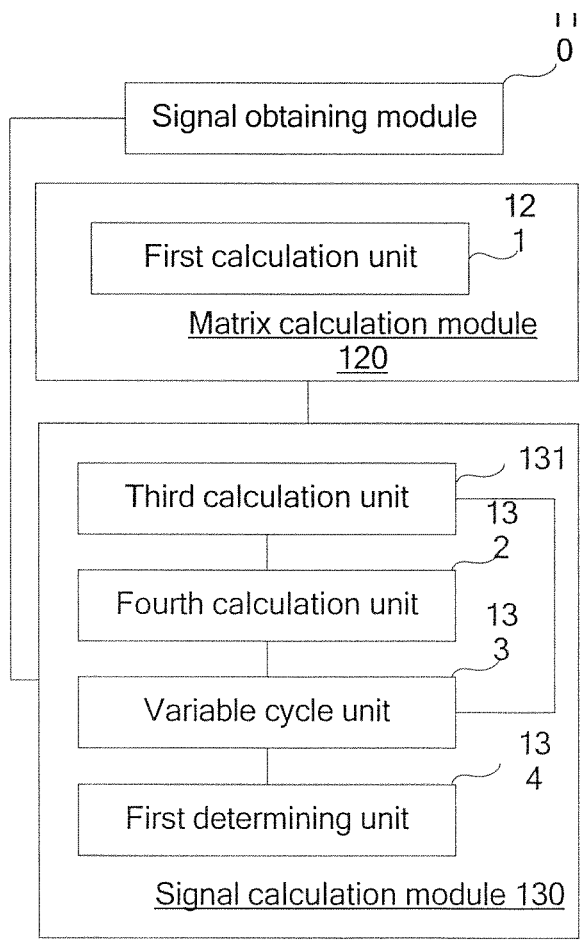
FIG. 2 is a structural block diagram of a signal processing apparatus according to another embodiment of the present invention.

Referring to FIG. 2, FIG. 2 shows a structural block diagram of a signal processing apparatus according to another embodiment of the present invention. The signal processing apparatus includes: a signal obtaining module 110, a matrix calculation module 120, and a signal calculation module 130.

The signal obtaining module 110 is configured to: set each sampling point signal on an OFDM symbol, and obtain an input signal.

For each OFDM symbol, a transmit end performs sampling on the OFDM symbol according to a preset sampling period, so as to obtain sampling points on all subcarriers. In this embodiment, the transmit end further needs to initialize the sampling points on all the subcarriers, that is, set a time-domain signal at each sampling point to 0 to obtain a sampling point signal. A process of performing sampling on the OFDM symbol is a conventional process, and details are not described herein in this embodiment.

The transmit end may further obtain an input modulation symbol, and determine the modulation symbol as the input signal. It is assumed that in a MIMO system, a total quantity of user antennas is M, and a data stream is mapped onto M layers after layer mapping is performed; then an obtained input signal $s=[s_{0,0}\ s_{0,1}\ \ldots\ s_{0,M-1}\ \ldots\ s_{W-1,0}\ s_{W-1,1}\ \ldots\ s_{W-1,M-1}]^T$, where $s_{W-1,M-1}$ represents the $M^{th}$ modulation symbol on the $W^{th}$ subcarrier.

The matrix calculation module 120 is configured to calculate a constraint matrix according to a frequency selective fading channel characteristic.

The constraint matrix in this embodiment is a matrix used to preprocess the input signal. Because frequency selective fading has a larger impact on the OFDM symbol in a transmission process, signals that are on some frequency and are received by a receive end are enhanced, and signals on some frequency are weakened, which causes severe interference between OFDM symbols. Therefore, the transmit end can calculate a proper constraint matrix according to the frequency selective fading channel characteristic, and reduce the interference between the OFDM symbols by using the constraint matrix.

The signal calculation module 130 is configured to calculate an output signal according to the sampling point signal and the input signal that are obtained by the signal obtaining module 110 and according to the constraint matrix obtained through calculation by the matrix calculation module 120.

The transmit end calculates the output signal according to the sampling point signal, the input signal, and the constraint matrix, further adds a CP to the output signal to form an OFDM time-domain signal, and sends the OFDM time-domain signal.

Optionally, the matrix calculation module 120 includes a first calculation unit 121 and a second calculation unit 122.

The first calculation unit 121 is configured to: when the input signal is corresponding to all subcarriers in the OFDM symbol, set a channel matrix H to a diagonal matrix according to the frequency selective fading channel characteristic, determine a confederate matrix F used to perform resource element RE mapping and frequency-time domain transformation, and multiply the channel matrix H by the confederate matrix F to obtain the constraint matrix.

Preprocessing the input signal by the transmit end includes three processes, precoding, RE mapping, and frequency-time domain transformation, respectively; therefore, a general procedure for preprocessing the input signal by the transmit end is as follows: The transmit end performs precoding on the input signal, performs RE mapping on a precoded output signal obtained after the precoding, and transforms a frequency-domain signal, obtained after the RE mapping, into a time-domain signal to obtain the output signal. However, the foregoing processing separately performed on the input signal causes a relatively long preprocessing procedure of the input signal, thereby reducing processing efficiency of the input signal. Therefore, one preferred solution is that the transmit end combines precoding, RE mapping, and frequency-time domain transformation to calculate a constraint matrix after the combination; and by using the constraint matrix, implements completing the foregoing preprocessing procedure by performing one operation process, which improves the processing efficiency. Specifically, the transmit end may set the channel matrix H to a diagonal matrix according to the frequency selective fading channel characteristic, determine the confederate matrix F used to perform resource element RE mapping and frequency-time domain transformation, and multiply the channel matrix H by the confederate matrix F to obtain the constraint matrix. The following separately describes setting processes of the channel matrix H and the confederate matrix F:

First, the channel matrix $$H = \begin{bmatrix} H_0 & & & \\ & H_1 & & \\ & & \ddots & \\ & & & H_{W-1} \end{bmatrix},$$

where $H_{W-1}$ is a channel matrix on the $w^{th}$ subcarrier, and w is a total quantity of subcarriers.

In this embodiment, an objective of precoding is to eliminate interference between OFDM symbols in a frequency selective fading case; and then the transmit end may set the channel matrix H according to the frequency selective fading channel characteristic.

Specifically, the interference between the OFDM symbols is relatively low when $s_{w-1}=H_{w-1} \cdot x_{w-1}$ is satisfied, where $s_{w-1}$ represents an input signal on the $w^{th}$ subcarrier, $H_{w-1}$ represents the channel matrix on the $w^{th}$ subcarrier, and $x_{w-1}$ represents a precoded output signal obtained after precoding is performed on the subcarrier. Therefore, when the transmit end calculates the precoded output signal $x_{w-1}$ on the $w^{th}$ subcarrier, only the channel matrix $H_{w-1}$ on the $w^{th}$ subcarrier needs to be reserved, and other elements in the $w^{th}$ row in the channel matrix H are set to 0; in this case, it may be obtained that the channel matrix $$H = \begin{bmatrix} H_0 & & & \\ & H_1 & & \\ & & \ddots & \\ & & & H_{W-1} \end{bmatrix}.$$

Second, the confederate matrix $$F = \begin{bmatrix} F_{0,0} & F_{0,1} & \cdots & F_{0,W-1} \\ F_{1,0} & F_{1,1} & \cdots & F_{1,W-1} \\ \vdots & \vdots & \ddots & \vdots \\ F_{W-1,0} & F_{W-1,1} & \cdots & F_{W-1,W-1} \end{bmatrix};$$

$$F_{m,n} = \frac{N_{\mathit{fft}}}{\sqrt{W}} \begin{bmatrix} W_{N_m}^{m,n} & & & \\ & W_{N_m}^{m,n} & & \\ & & \ddots & \\ & & & W_{N_m}^{m,n} \end{bmatrix},$$

and $W_{N_{\mathit{fft}}}^{m,n} = (e^{-2\pi i/(W-1)})^{m*n}$; where $F_{m,n}$ is an operation element of the $m^{th}$ user antenna on the $n^{th}$ base station transmit antenna, $W_N^{m,n}$ is an operation factor of $F_{m,n}$, $N_{\mathit{fft}}$ is a quantity of points of fast Fourier transform FFT, where $0 \leq m \leq M-1$, M is a total quantity of user antennas, $0 \leq n \leq N-1$, and N is a total quantity of base station transmit antennas.

In this embodiment, an objective of RE mapping is to map a frequency-domain signal on a subcarrier to a corresponding subcarrier in a physical resource block, and an objective of frequency-time domain transformation is to transform the frequency-domain signal into a time-domain signal; and then an operation matrix used to perform frequency-time domain transformation is set according to a mapping sequence.

Optionally, the second calculation unit 132 is specifically configured to: obtain an operation matrix used to perform frequency-time domain transformation; and rearrange, according to a mapping sequence of RE mapping, operation factors in an operation element of the operation matrix to obtain the confederate matrix F.

The transmit end may obtain the operation matrix used to perform frequency-time domain transformation, and rearrange the operation factors in the operation element of the operation matrix to obtain the confederate matrix F, so that an output signal obtained by multiplying the precoded output signal by the confederate matrix F is a time-domain signal mapped to a corresponding subcarrier in a physical resource block.

Because s=HFa=HX where s is an input signal, C is a constraint matrix, a is an output signal in a time domain, H is a channel matrix, X is a frequency-domain signal, and F is a confederate matrix; and it is assumed that $$s = [s_{0,0}\ s_{0,1} \ldots s_{0,M-1} \ldots s_{W-1,0}\ s_{W-1,1} \ldots s_{W-1,M-1}]^T,$$

$$a = [x_{0,0}\ x_{0,1} \ldots x_{0,N-1} \ldots x_{W-1,0}\ x_{W-1,1} \ldots x_{W-1,N-1}]^T, \text{ and}$$

$$X = [X_{0,0}\ X_{0,1} \ldots X_{0,M-1} \ldots X_{W-1,0}\ X_{W-1,1} \ldots X_{W-1,M-1}]^T,$$

the above three equations are substituted into s=HFa=HX to obtain:

$$\begin{bmatrix} s_{0,0} \\ s_{0,1} \\ \vdots \\ s_{0,M-1} \\ \vdots \\ s_{W-1,0} \\ s_{W-1,1} \\ \vdots \\ s_{W-1,M-1} \end{bmatrix} = \begin{bmatrix} H_0 & & & \\ & H_1 & & \\ & & \ddots & \\ & & & H_{W-1} \end{bmatrix} \quad (1)$$

$$\begin{bmatrix} F_{0,0} & F_{0,1} & \cdots & F_{0,W-1} \\ F_{1,0} & F_{1,1} & \cdots & F_{1,W-1} \\ \vdots & \vdots & \ddots & \vdots \\ F_{W-1,0} & F_{W-1,1} & \cdots & F_{W-1,W-1} \end{bmatrix} \begin{bmatrix} x_{0,0} \\ x_{0,1} \\ \vdots \\ x_{0,N-1} \\ \vdots \\ x_{W-1,0} \\ x_{W-1,1} \\ \vdots \\ x_{W-1,N-1} \end{bmatrix};$$

$$\begin{bmatrix} s_{0,0} \\ s_{0,1} \\ \vdots \\ s_{0,M-1} \\ \vdots \\ s_{W-1,0} \\ s_{W-1,1} \\ \vdots \\ s_{W-1,M-1} \end{bmatrix} = \begin{bmatrix} H_0 & & & \\ & H_1 & & \\ & & \ddots & \\ & & & H_{W-1} \end{bmatrix} \begin{bmatrix} X_{0,0} \\ X_{0,1} \\ \vdots \\ X_{0,N-1} \\ \vdots \\ X_{W-1,0} \\ X_{W-1,1} \\ \vdots \\ X_{W-1,N-1} \end{bmatrix} \quad (2)$$

Formula (1) and formula (2) may be combined to obtain:

$$\begin{bmatrix} X_{0,0} \\ X_{0,1} \\ \vdots \\ X_{0,N-1} \\ \vdots \\ X_{W-1,0} \\ X_{W-1,1} \\ \vdots \\ X_{W-1,N-1} \end{bmatrix} = \begin{bmatrix} F_{0,0} & F_{0,1} & \cdots & F_{0,W-1} \\ F_{1,0} & F_{1,1} & \cdots & F_{1,W-1} \\ \vdots & \vdots & \ddots & \vdots \\ F_{W-1,0} & F_{W-1,1} & \cdots & F_{W-1,W-1} \end{bmatrix} \begin{bmatrix} x_{0,0} \\ x_{0,1} \\ \vdots \\ x_{0,N-1} \\ \vdots \\ x_{W-1,0} \\ x_{W-1,1} \\ \vdots \\ x_{W-1,N-1} \end{bmatrix}$$

In addition, a result of frequency-time domain transformation is $$X_{0,0} = \frac{N_{\mathit{fft}}}{\sqrt{W}} \cdot W_{N_{\mathit{fft}}}^{0,0} \cdot x_{0,0} + \frac{N_{\mathit{fft}}}{\sqrt{W}} \cdot W_{N_{\mathit{fft}}}^{0,1} \cdot x_{1,0} + \ldots + \frac{N_{\mathit{fft}}}{\sqrt{W}} \cdot W_{N_{\mathit{fft}}}^{0,W-1} \cdot x_{W-1,0};$$

therefore, the transmit end needs to set each operation element in the confederate matrix F to a diagonal matrix.

For example, $$F_{m,n} = \frac{N_{\mathit{fft}}}{\sqrt{W}} \begin{bmatrix} W_{N_{\mathit{fft}}}^{m,n} & & & \\ & W_{N_{\mathit{fft}}}^{m,n} & & \\ & & \ddots & \\ & & & W_{N_{\mathit{fft}}}^{m,n} \end{bmatrix},$$

and $W_{N_{\mathit{fft}}}^{m,n} = (e^{-2\pi i/(W-1)})^{m*n}$; where $F_{m,n}$ is an operation element of the $m^{th}$ user antenna on the $n^{th}$ base station transmit antenna, $W_{N_{\mathit{fft}}}^{m,n}$ is an operation factor of $F_{m,n}$, $N_{\mathit{fft}}$ is a quantity of points of FFT (Fast Fourier Transform, fast Fourier transform), where $0 \leq m \leq M-1$, M is a total quantity of user antennas, $0 \leq n \leq N-1$, N is a total quantity of base station transmit antennas, and w is a total quantity of subcarriers. Both $N_{\mathit{fft}}$ and $W_{N_{\mathit{fft}}}^{m,n}$ can be obtained through calculation by using a conventional procedure, and details are not described herein in this embodiment.

Optionally, the signal calculation module 130 includes:

a third calculation unit 131, configured to calculate the sampling point signal, the input signal, and the constraint matrix to obtain a first intermediate variable;

a fourth calculation unit 132, configured to: calculate a PAR threshold of a peak clipping operation according to the first intermediate variable obtained through calculation by the third calculation unit 131, and calculate a second intermediate variable according to the threshold;

a variable cycle unit 133, configured to: when a current quantity of iteration times does not reach a preset iteration threshold, calculate a third intermediate variable according to the second intermediate variable obtained through calculation by the fourth calculation unit 132, determine the third intermediate variable as the sampling point signal, and re-perform the operation of calculating the sampling point signal, the input signal, and the constraint matrix to obtain a first intermediate variable; and a first determining unit 134, configured to: when the current quantity of iteration times reaches the preset iteration threshold and the input signal is corresponding to all the subcarriers in the OFDM symbol, determine the second intermediate variable obtained through calculation by the fourth calculation unit 132 as the output signal.

In this embodiment, it is assumed that the sampling point signal $x_0 = 0_{N \times 1}$, $y_1 = x_0$, $t_1 = 1$, and $L = 2\sigma^2_{max}(C)$, where $\sigma_{max}(C)$ is a maximum singular value of the constraint matrix C, $C^H$ is a conjugate transpose of the constraint matrix C, s is the input signal, a quantity of iteration times $k = 1, 2, \ldots, K$ and an iteration threshold is K; then a specific algorithm is as follows:

Step 1: Calculate the first intermediate variable w according to $$w = y_k - \frac{2}{L} C^H (Cy_K - s).$$

Step 2: Calculate the PAR threshold $\alpha$ according to $$\alpha = \mathrm{argmin}_\alpha \left\{ \lambda \alpha + \frac{2}{L} \sum_{i=1}^{N} ([|[w]_i| - \alpha]^+)^2 \right\}.$$

Step 3: Calculate the second intermediate variable $x_k$ according to $x_k = \mathrm{trunc}_\alpha(w)$.

Step 4: If the current quantity of iteration times $k < K$, calculate $t_{k+1}$ according to $$t_{k+1} = \frac{1}{2}\left(1 + \sqrt{1 + 4 \times t_k^2}\right),$$

and calculate the third intermediate variable $y_{k+1}$ according to $$y_{k+1} = x_k + \frac{t_k - 1}{t_{k+1}} (x_k - x_{k-1});$$

determine $y_{k+1}$ as $y_k$, and continue to perform step 1.

Step 5: If the current quantity of iteration times $k = K$ and s is corresponding to all the subcarriers in the OFDM symbol, determine the second intermediate variable $x_k$ as the output signal.

In conclusion, the signal processing apparatus provided in this embodiment of the present invention sets each sampling point signal on an OFDM symbol, and obtains an input signal; calculates a constraint matrix according to a frequency selective fading channel characteristic; calculates an output signal according to the sampling point signal, the input signal, and the constraint matrix; and can obtain the output signal after preprocessing the input signal according to the frequency selective fading channel characteristic, so that frequency selective fading has a smaller impact on transmission of an OFDM symbol obtained according to the output signal, which resolves a problem that a constraint matrix obtained according to a flat fading channel characteristic is not applicable to the OFDM symbol, thereby achieving an effect of reducing the impact of the frequency selective fading on the transmission of the OFDM symbol.

In addition, a channel matrix H is set to a diagonal matrix according to the frequency selective fading channel characteristic, a confederate matrix F used to perform resource element RE mapping and frequency-time domain transformation is determined, and the constraint matrix is obtained by multiplying the channel matrix H by the confederate matrix F; in this way, precoding, RE mapping, and frequency-time domain transformation can be combined to directly calculate the output signal according to the constraint matrix, and there is no need to separately perform preprocessing, RE mapping, and frequency-time domain transformation on the input signal, which simplifies a processing procedure of the OFDM symbol and improves processing efficiency.

Figure 3:
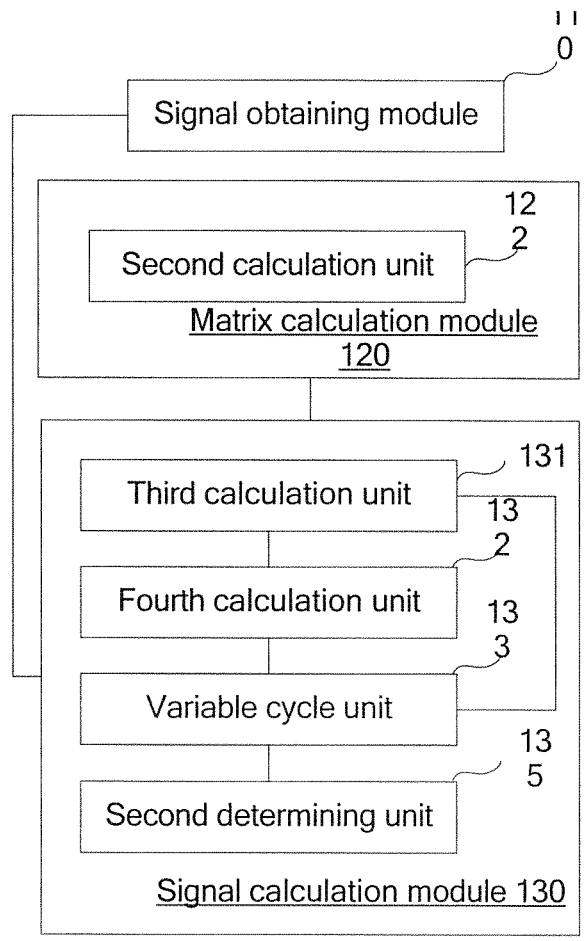
FIG. 3 is a structural block diagram of a signal processing apparatus according to still another embodiment of the present invention.

Referring to FIG. 3, FIG. 3 shows a structural block diagram of a signal processing apparatus according to still another embodiment of the present invention. The signal processing apparatus includes: a signal obtaining module 110, a matrix calculation module 120, and a signal calculation module 130.

The signal obtaining module 110 is configured to: set each sampling point signal on an OFDM symbol, and obtain an input signal.

For each OFDM symbol, a transmit end performs sampling on the OFDM symbol according to a preset sampling period, so as to obtain a sampling point on a single subcarrier. In this embodiment, the transmit end further needs to initialize each sampling point on the single subcarrier, that is, set a time-domain signal at each sampling point to 0 to obtain a sampling point signal. A process of performing sampling on the OFDM symbol is a conventional process, and details are not described herein in this embodiment.

The transmit end may further obtain an input modulation symbol, and determine the modulation symbol as the input signal. It is assumed that in a MIMO system, a total quantity of user antennas is M, and a data stream is mapped onto M layers after layer mapping is performed; then an obtained input signal $s=\lfloor s_{W-1,0} \ s_{W-1,1} \ \cdots \ s_{W-1,M-1} \rfloor$, where $s_{W-1,M-1}$ represents the $M^{th}$ modulation symbol on the $W^{th}$ subcarrier.

The matrix calculation module 120 is configured to calculate a constraint matrix according to a frequency selective fading channel characteristic.

The constraint matrix in this embodiment is a matrix used to preprocess the input signal. Because frequency selective fading has a larger impact on the OFDM symbol in a transmission process, signals that are on some frequency and are received by a receive end are enhanced, and signals on some frequency are weakened, which causes severe interference between OFDM symbols. Therefore, the transmit end can calculate a proper constraint matrix according to the frequency selective fading channel characteristic, and reduce the interference between the OFDM symbols by using the constraint matrix.

Preprocessing the input signal by the transmit end includes three processes, precoding, RE mapping, and frequency-time domain transformation, respectively; if precoding, RE mapping, and frequency-time domain transformation are combined to calculate a constraint matrix after the combination, the constraint matrix is relatively complexed in this case, although completing the foregoing preprocessing procedure by performing one operation process is implemented by using the constraint matrix, and processing efficiency is improved. Therefore, in this embodiment, precoding, RE mapping, and frequency-time domain transformation are separately performed on the signal. That is, the transmit end performs precoding on the input signal, performs RE mapping on a precoded output signal obtained after the precoding, and transforms a frequency-domain signal, obtained after the RE mapping, into a time-domain signal to obtain an output signal, so that calculation complexity of the output signal is reduced by simplifying the constraint matrix.

The signal calculation module 130 is configured to calculate an output signal according to the sampling point signal and the input signal that are obtained by the signal obtaining module 110 and according to the constraint matrix obtained through calculation by the matrix calculation module 120.

The transmit end calculates the sampling point signal, the input signal, and the constraint matrix, and performs RE mapping and frequency-time domain transformation on a result of the calculation to obtain the output signal; further adds a CP to the output signal to form an OFDM time-domain signal; and sends the OFDM time-domain signal.

Optionally, the matrix calculation module 120 includes:

a second calculation unit 122, configured to: when the input signal is corresponding to one subcarrier in the OFDM symbol, set a channel matrix H to a diagonal matrix according to the frequency selective fading channel characteristic, and determine the channel matrix H as the constraint matrix.

Optionally, the channel matrix $$H = \begin{bmatrix} H_0 & & & \\ & H_1 & & \\ & & \ddots & \\ & & & H_{W-1} \end{bmatrix},$$

where $H_{W-1}$ is a channel matrix on the $w^{th}$ subcarrier, and w is a total quantity of subcarriers.

In this embodiment, an objective of precoding is to eliminate interference between OFDM symbols in a frequency selective fading case; and then the transmit end may set the channel matrix H according to the frequency selective fading channel characteristic.

Specifically, the interference between the OFDM symbols is relatively low when $s_{w-1}=H_{w-1} \cdot x_{w-1}$ is satisfied, where $s_{w-1}$ represents an input signal on the $w^{th}$ subcarrier, $H_{w-1}$ represents the channel matrix on the $w^{th}$ subcarrier, and $x_{w-1}$ represents a precoded output signal obtained after precoding is performed on the $w^{th}$ subcarrier. Therefore, when the transmit end calculates the precoded output signal $x_{w-1}$ on the $w^{th}$ subcarrier, only the channel matrix $H_{w-1}$ on the $w^{th}$ subcarrier needs to be reserved, and other elements in the $w^{th}$ row in the channel matrix H are set to 0; in this case, it may be obtained that the channel matrix $$H = \begin{bmatrix} H_0 & & & \\ & H_1 & & \\ & & \ddots & \\ & & & H_{W-1} \end{bmatrix}.$$

Optionally, the signal calculation module 130 includes:

a third calculation unit 131, configured to calculate the sampling point signal, the input signal, and the constraint matrix to obtain a first intermediate variable;

a fourth calculation unit 132, configured to: calculate a PAR threshold of a peak clipping operation according to the first intermediate variable obtained through calculation by the third calculation unit 131, and calculate a second intermediate variable according to the threshold;

a variable cycle unit 133, configured to: when a current quantity of iteration times does not reach a preset iteration threshold, calculate a third intermediate variable according to the second intermediate variable obtained through calculation by the fourth calculation unit 132, determine the third intermediate variable as the sampling point signal, and re-perform the step of calculating the sampling point signal, the input signal, and the constraint matrix to obtain a first intermediate variable; and a second determining unit 135, configured to: when the current quantity of iteration times reaches the preset iteration threshold and the input signal is corresponding to one subcarrier in the OFDM symbol, perform RE mapping and frequency-time domain transformation on the second intermediate variable obtained through calculation by the fourth calculation unit 132 to obtain the output signal.

In this embodiment, it is assumed that the sampling point signal $x_0=0_{N\times 1}$, $y_1=x_0$, $t_1=1$, and $L=2\sigma^2_{max}(C)$, where $\sigma_{max}(C)$ is a maximum singular value of a constraint matrix C, $C^H$ is a conjugate transpose of the constraint matrix C, s is the input signal, a quantity of iteration times k=1, 2, . . . , K and an iteration threshold is K; then a specific algorithm is as follows:

Step 1: Calculate the first intermediate variable w according to $$w = y_k - \frac{2}{L}C^H(Cy_K - s).$$

Step 2: Calculate the PAR threshold α according to $$\alpha = \mathrm{argmin}_\alpha\left\{\lambda\alpha + \frac{2}{L}\sum_{i=1}^{N}([|\,[w]_i\,| - \alpha]^+)^2\right\}.$$

Step 3: Calculate the second intermediate variable $x_k$ according to $x_k = \mathrm{trunc}_\alpha(w)$.

Step 4: If the current quantity of iteration times k<K, calculate $t_{k+1}$ according to $$t_{k+1} = \frac{1}{2}\left(1 + \sqrt{1 + 4\times t_k^2}\right),$$

and calculate the third intermediate variable $y_{k+1}$ according to $$y_{k+1} = x_k + \frac{t_k - 1}{t_{k+1}}(x_k - x_{k-1});$$

determine $y_{k+1}$ as $y_k$, and continue to perform step 1.

Step 5: If the current quantity of iteration times k=K and s is corresponding to one subcarrier in the OFDM symbol, perform RE mapping and frequency-time domain transformation on the second intermediate variable $x_k$ to obtain the output signal.

Optionally, the second determining unit 135 is specifically configured to: arrange the second intermediate variable according to a mapping sequence of RE mapping; and multiply an arranged second intermediate variable by an operation matrix used to perform frequency-time domain transformation, to obtain the output signal.

The transmit end may arrange the second intermediate variable according to the mapping sequence of RE mapping, so as to implement mapping the second intermediate variable to a corresponding subcarrier in a physical resource block. The second intermediate variable is a frequency-domain signal; therefore, the transmit end further needs to multiply the arranged second intermediate variable by the operation matrix used to perform frequency-time domain transformation, so as to transform the second intermediate variable from a frequency-domain signal into a time-domain signal, and obtain the output signal. The performing RE mapping and frequency-time domain transformation on the second intermediate variable is a conventional procedure, and details are not described herein in this embodiment.

In conclusion, the signal processing apparatus provided in this embodiment of the present invention sets each sampling point signal on an OFDM symbol, and obtains an input signal; calculates a constraint matrix according to a frequency selective fading channel characteristic; calculates an output signal according to the sampling point signal, the input signal, and the constraint matrix; and can obtain the output signal after preprocessing the input signal according to the frequency selective fading channel characteristic, so that frequency selective fading has a smaller impact on transmission of an OFDM symbol obtained according to the output signal, which resolves a problem that a constraint matrix obtained according to a flat fading channel characteristic is not applicable to the OFDM symbol, thereby achieving an effect of reducing the impact of the frequency selective fading on the transmission of the OFDM symbol.

In addition, a second intermediate variable is arranged according to a mapping sequence of RE mapping, and an arranged second intermediate variable is multiplied by an operation matrix used to perform frequency-time domain transformation, to obtain the output signal; in this way, an output signal on each subcarrier in the OFDM symbol can be separately calculated, thereby reducing calculation complexity of the output signal by simplifying the constraint matrix.

Figure 4:
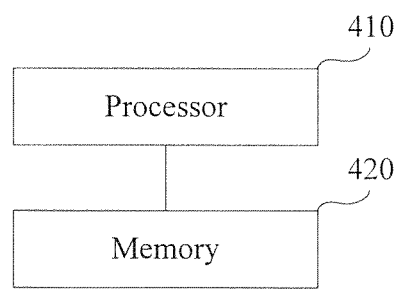
FIG. 4 is a structural block diagram of a signal processing apparatus according to an embodiment of the present invention.

Referring to FIG. 4, FIG. 4 shows a structural block diagram of a signal processing apparatus according to an embodiment of the present invention. The signal processing apparatus may include: a processor 410 and a memory 420. The processor 410 is coupled to the memory 420.

The memory 420 stores a computer program, and the processor 410 may perform the following operations by accessing the computer program.

The processor 410 is configured to: set each sampling point signal on an OFDM symbol, and obtain an input signal; calculate a constraint matrix according to a frequency selective fading channel characteristic; and calculate an output signal according to the sampling point signal, the input signal, and the constraint matrix.

For each OFDM symbol, a transmit end performs sampling on the OFDM symbol according to a preset sampling period, so as to obtain each sampling point. In this embodiment, the transmit end further needs to initialize each sampling point, that is, set a time-domain signal at each sampling point to 0 to obtain a sampling point signal. The transmit end may further obtain an input modulation symbol, and determine the modulation symbol as the input signal.

The constraint matrix in this embodiment is a matrix used to preprocess the input signal. Because frequency selective fading has a larger impact on the OFDM symbol in a transmission process, signals that are on some frequency and are received by a receive end are enhanced, and signals on some frequency are weakened, which causes severe interference between OFDM symbols. Therefore, the transmit end can calculate a proper constraint matrix according to the frequency selective fading channel characteristic, and reduce the interference between the OFDM symbols by using the constraint matrix.

In conclusion, the signal processing apparatus provided in this embodiment of the present invention sets each sampling point signal on an OFDM symbol, and obtains an input signal; calculates a constraint matrix according to a frequency selective fading channel characteristic; calculates an output signal according to the sampling point signal, the input signal, and the constraint matrix; and can obtain the output signal after preprocessing the input signal according to the frequency selective fading channel characteristic, so that frequency selective fading has a smaller impact on transmission of an OFDM symbol obtained according to the output signal, which resolves a problem that a constraint matrix obtained according to a flat fading channel characteristic is not applicable to the OFDM symbol, thereby achieving an effect of reducing the impact of the frequency selective fading on the transmission of the OFDM symbol.

Another embodiment of the present invention further provides a signal processing apparatus. The signal processing apparatus may include: a processor 410 and a memory 420. The processor 410 is coupled to the memory 420.

The memory 420 stores a computer program, and the processor 410 may perform the following operations by accessing the computer program.

The processor 410 is configured to: set each sampling point signal on an OFDM symbol, and obtain an input signal; calculate a constraint matrix according to a frequency selective fading channel characteristic; and calculate an output signal according to the sampling point signal, the input signal, and the constraint matrix.

For each OFDM symbol, a transmit end performs sampling on the OFDM symbol according to a preset sampling period, so as to obtain sampling points on all subcarriers. In this embodiment, the transmit end further needs to initialize the sampling points on all the subcarriers, that is, set a time-domain signal at each sampling point to 0 to obtain a sampling point signal. The transmit end may further obtain an input modulation symbol, and determine the modulation symbol as the input signal. It is assumed that in a MIMO system, a total quantity of user antennas is M, and a data stream is mapped onto M layers after layer mapping is performed; then an obtained input signal $s=[s_{0,0}\ s_{0,1}\ \cdots\ s_{0,M-1}\ \cdots\ s_{W-1,0}\ s_{W-1,1}\ \cdots\ s_{W-1,M-1}]^T$, where $s_{W-1,M-1}$ represents the $M^{th}$ modulation symbol on the $W^{th}$ subcarrier.

The constraint matrix in this embodiment is a matrix used to preprocess the input signal. Because frequency selective fading has a larger impact on the OFDM symbol in a transmission process, signals that are on some frequency and are received by a receive end are enhanced, and signals on some frequency are weakened, which causes severe interference between OFDM symbols. Therefore, the transmit end can calculate a proper constraint matrix according to the frequency selective fading channel characteristic, and reduce the interference between the OFDM symbols by using the constraint matrix.

Optionally, the processor 410 is specifically configured to: if the input signal is corresponding to all subcarriers in the OFDM symbol, set a channel matrix H to a diagonal matrix according to the frequency selective fading channel characteristic, determine a confederate matrix F used to perform resource element RE mapping and frequency-time domain transformation, and multiply the channel matrix H by the confederate matrix F to obtain the constraint matrix.

Preprocessing the input signal by the transmit end includes three processes, precoding, RE mapping, and frequency-time domain transformation, respectively; therefore, a general procedure for preprocessing the input signal by the transmit end is as follows: The transmit end performs precoding on the input signal, performs RE mapping on a precoded output signal obtained after the precoding, and transforms a frequency-domain signal, obtained after the RE mapping, into a time-domain signal to obtain the output signal. However, the foregoing processing separately performed on the input signal causes a relatively long preprocessing procedure of the input signal, thereby reducing processing efficiency of the input signal. Therefore, one preferred solution is that the transmit end combines precoding, RE mapping, and frequency-time domain transformation to calculate a constraint matrix after the combination; and by using the constraint matrix, implements completing the foregoing preprocessing procedure by performing one operation process, which improves the processing efficiency. Specifically, the transmit end may set the channel matrix H to a diagonal matrix according to the frequency selective fading channel characteristic, determine the confederate matrix F used to perform resource element RE mapping and frequency-time domain transformation, and multiply the channel matrix H by the confederate matrix F to obtain the constraint matrix.

First, the channel matrix $$H = \begin{bmatrix} H_0 & & & \\ & H_1 & & \\ & & \ddots & \\ & & & H_{W-1} \end{bmatrix},$$

where $H_{W-1}$ is a channel matrix on the $w^{th}$ subcarrier, and w is a total quantity of subcarriers.

Second, the confederate matrix $$F = \begin{bmatrix} F_{0,0} & F_{0,1} & \cdots & F_{0,W-1} \\ F_{1,0} & F_{1,1} & \cdots & F_{1,W-1} \\ \vdots & \vdots & \ddots & \vdots \\ F_{W-1,0} & F_{W-1,1} & \cdots & F_{W-1,W-1} \end{bmatrix};$$

$$F_{m,n} = \frac{N_{\mathit{fft}}}{\sqrt{W}} \begin{bmatrix} W_{N_m}^{m,n} & & & \\ & W_{N_m}^{m,n} & & \\ & & \ddots & \\ & & & W_{N_m}^{m,n} \end{bmatrix},$$

and $W_{N_{\mathit{fft}}}^{m,n} = (e^{-2\pi i/(W-1)})^{m*n}$; where $F_{m,n}$ is an operation element of the $m^{th}$ user antenna on the $n^{th}$ base station transmit antenna, $W_N^{m,n}$ is an operation factor of $F_{m,n}$, $N_{\mathit{fft}}$ is a quantity of points of fast Fourier transform FFT, where $0 \leq m \leq M-1$, M is a total quantity of user antennas, $0 \leq n \leq N-1$, and N is a total quantity of base station transmit antennas.

For a process of setting the channel matrix H and the confederate matrix F, refer to description in the foregoing embodiment, and details are not described herein.

Optionally, the processor 410 is specifically configured to: calculate the sampling point signal, the input signal, and the constraint matrix to obtain a first intermediate variable; calculate a PAR threshold of a peak clipping operation according to the first intermediate variable, and calculate a second intermediate variable according to the threshold; and if a current quantity of iteration times does not reach a preset iteration threshold, calculate a third intermediate variable according to the second intermediate variable, determine the third intermediate variable as the sampling point signal, and re-perform the step of calculating the sampling point signal, the input signal, and the constraint matrix to obtain a first intermediate variable; or if a current quantity of iteration times reaches a preset iteration threshold and the input signal is corresponding to all the subcarriers in the OFDM symbol, determine the second intermediate variable as the output signal.

For a calculation process of the output signal, refer to description in the foregoing embodiment, and details are not described herein.

In conclusion, the signal processing apparatus provided in this embodiment of the present invention sets each sampling point signal on an OFDM symbol, and obtains an input signal; calculates a constraint matrix according to a frequency selective fading channel characteristic; calculates an output signal according to the sampling point signal, the input signal, and the constraint matrix; and can obtain the output signal after preprocessing the input signal according to the frequency selective fading channel characteristic, so that frequency selective fading has a smaller impact on transmission of an OFDM symbol obtained according to the output signal, which resolves a problem that a constraint matrix obtained according to a flat fading channel characteristic is not applicable to the OFDM symbol, thereby achieving an effect of reducing the impact of the frequency selective fading on the transmission of the OFDM symbol.

In addition, a channel matrix H is set to a diagonal matrix according to the frequency selective fading channel characteristic, a confederate matrix F used to perform resource element RE mapping and frequency-time domain transformation is determined, and the constraint matrix is obtained by multiplying the channel matrix H by the confederate matrix F; in this way, precoding, RE mapping, and frequency-time domain transformation can be combined to directly calculate the output signal according to the constraint matrix, and there is no need to separately perform preprocessing, RE mapping, and frequency-time domain transformation on the input signal, which simplifies a processing procedure of the OFDM symbol and improves processing efficiency.

Still another embodiment of the present invention further provides a signal processing apparatus. The signal processing apparatus may include: a processor 410 and a memory 420. The processor 410 is coupled to the memory 420.

The memory 420 stores a computer program, and the processor 410 may perform the following operations by accessing the computer program.

The processor 410 is configured to: set each sampling point signal on an OFDM symbol, and obtain an input signal; calculate a constraint matrix according to a frequency selective fading channel characteristic; and calculate an output signal according to the sampling point signal, the input signal, and the constraint matrix.

For each OFDM symbol, a transmit end performs sampling on the OFDM symbol according to a preset sampling period, so as to obtain a sampling point on a single subcarrier. In this embodiment, the transmit end further needs to initialize each sampling point on the single subcarrier, that is, set a time-domain signal at each sampling point to 0 to obtain a sampling point signal. The transmit end may further obtain an input modulation symbol, and determine the modulation symbol as the input signal. It is assumed that in a MIMO system, a total quantity of user antennas is M, and a data stream is mapped onto M layers after layer mapping is performed; then an obtained input signal $s=[s_{W-1,0} \ s_{W-1,1} \ \cdots \ s_{W-1,M-1}]$, where $s_{W-1,M-1}$ represents the $M^{th}$ modulation symbol on the $W^{th}$ subcarrier.

The constraint matrix in this embodiment is a matrix used to preprocess the input signal. Because frequency selective fading has a larger impact on the OFDM symbol in a transmission process, signals that are on some frequency and are received by a receive end are enhanced, and signals on some frequency are weakened, which causes severe interference between OFDM symbols. Therefore, the transmit end can calculate a proper constraint matrix according to the frequency selective fading channel characteristic, and reduce the interference between the OFDM symbols by using the constraint matrix.

Preprocessing the input signal by the transmit end includes three processes, precoding, RE mapping, and frequency-time domain transformation, respectively; if precoding, RE mapping, and frequency-time domain transformation are combined to calculate a constraint matrix after the combination, the constraint matrix is relatively complexed in this case, although completing the foregoing preprocessing procedure by performing one operation process is implemented by using the constraint matrix, and processing efficiency is improved. Therefore, in this embodiment, precoding, RE mapping, and frequency-time domain transformation are separately performed on the signal. That is, the transmit end performs precoding on the input signal, performs RE mapping on a precoded output signal obtained after the precoding, and transforms a frequency-domain signal, obtained after the RE mapping, into a time-domain signal to obtain the output signal, so that calculation complexity of the output signal is reduced by simplifying the constraint matrix.

Optionally, the processor 410 is specifically configured to: if the input signal is corresponding to one subcarrier in the OFDM symbol, set a channel matrix H to a diagonal matrix according to the frequency selective fading channel characteristic, and determine the channel matrix H as the constraint matrix.

Optionally, the channel matrix $$H = \begin{bmatrix} H_0 & & & \\ & H_1 & & \\ & & \ddots & \\ & & & H_{W-1} \end{bmatrix},$$

where $H_{W-1}$ is a channel matrix on the $w^{th}$ subcarrier, and w is a total quantity of subcarriers.

For a process of setting the channel matrix H, refer to description in the foregoing embodiment, and details are not described herein.

Optionally, the processor 410 is specifically configured to: calculate the sampling point signal, the input signal, and the constraint matrix to obtain a first intermediate variable; calculate a peak-to-average ratio PAR threshold of a peak clipping operation according to the first intermediate variable, and calculate a second intermediate variable according to the threshold; and if a current quantity of iteration times does not reach a preset iteration threshold, calculate a third intermediate variable according to the second intermediate variable, determine the third intermediate variable as the sampling point signal, and re-perform the step of calculating the sampling point signal, the input signal, and the constraint matrix to obtain a first intermediate variable; or if a current quantity of iteration times reaches a preset iteration threshold and the input signal is corresponding to one subcarrier in the OFDM symbol, perform RE mapping and frequency-time domain transformation on the second intermediate variable to obtain the output signal.

For a calculation process of the output signal, refer to description in the foregoing embodiment, and details are not described herein.

Optionally, the processor 410 is specifically configured to: arrange the first intermediate variable according to a mapping sequence of RE mapping; and multiply an arranged first intermediate variable by an operation matrix used to perform frequency-time domain transformation, to obtain the output signal.

The transmit end may arrange the second intermediate variable according to the mapping sequence of RE mapping, so as to implement mapping the second intermediate variable to a corresponding subcarrier in a physical resource block. The second intermediate variable is a frequency-domain signal; therefore, the transmit end further needs to multiply the arranged second intermediate variable by the operation matrix used to perform frequency-time domain transformation, so as to transform the second intermediate variable from a frequency-domain signal into a time-domain signal, and obtain the output signal. The performing RE mapping and frequency-time domain transformation on the second intermediate variable is a conventional procedure, and details are not described herein in this embodiment.

In conclusion, the signal processing apparatus provided in this embodiment of the present invention sets each sampling point signal on an OFDM symbol, and obtains an input signal; calculates a constraint matrix according to a frequency selective fading channel characteristic; calculates an output signal according to the sampling point signal, the input signal, and the constraint matrix; and can obtain the output signal after preprocessing the input signal according to the frequency selective fading channel characteristic, so that frequency selective fading has a smaller impact on transmission of an OFDM symbol obtained according to the output signal, which resolves a problem that a constraint matrix obtained according to a flat fading channel characteristic is not applicable to the OFDM symbol, thereby achieving an effect of reducing the impact of the frequency selective fading on the transmission of the OFDM symbol.

In addition, a second intermediate variable is arranged according to a mapping sequence of RE mapping, and an arranged second intermediate variable is multiplied by an operation matrix used to perform frequency-time domain transformation, to obtain the output signal; in this way, an output signal on each subcarrier in the OFDM symbol can be separately calculated, thereby reducing calculation complexity of the output signal by simplifying the constraint matrix.

Figure 5:
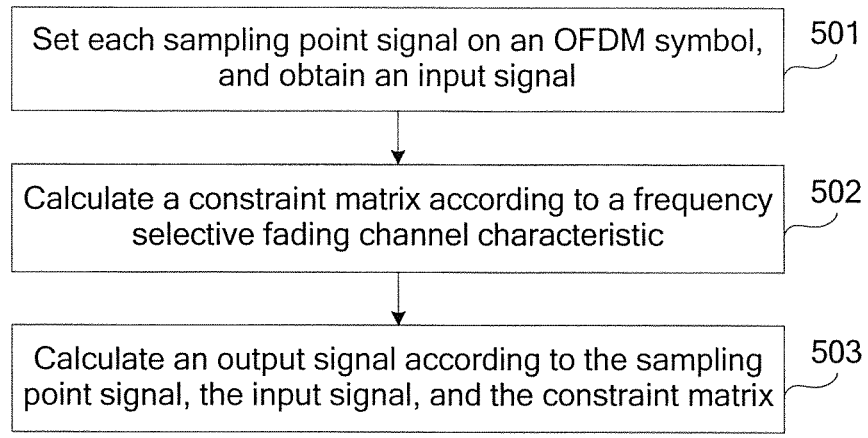
FIG. 5 is a method flowchart of a signal processing method according to an embodiment of the present invention.

Referring to FIG. 5, FIG. 5 shows a method flowchart of a signal processing method according to an embodiment of the present invention. The signal processing method includes the following steps:

Step 501: Set each sampling point signal on an OFDM symbol, and obtain an input signal.

For each OFDM symbol, a transmit end performs sampling on the OFDM symbol according to a preset sampling period, so as to obtain each sampling point. In this embodiment, the transmit end further needs to initialize each sampling point, that is, set a time-domain signal at each sampling point to 0 to obtain a sampling point signal.

The transmit end may further obtain an input modulation symbol, and determine the modulation symbol as the input signal.

Step 502: Calculate a constraint matrix according to a frequency selective fading channel characteristic.

The constraint matrix in this embodiment is a matrix used to preprocess the input signal. Because frequency selective fading has a larger impact on the OFDM symbol in a transmission process, signals that are on some frequency and are received by a receive end are enhanced, and signals on some frequency are weakened, which causes severe interference between OFDM symbols. Therefore, the transmit end can calculate a proper constraint matrix according to the frequency selective fading channel characteristic, and reduce the interference between the OFDM symbols by using the constraint matrix.

Step 503: Calculate an output signal according to the sampling point signal, the input signal, and the constraint matrix.

The transmit end calculates the output signal according to the sampling point signal, the input signal, and the constraint matrix, further adds a CP to the output signal to form an OFDM time-domain signal, and sends the OFDM time-domain signal.

In conclusion, in the signal processing method provided in this embodiment of the present invention, each sampling point signal on an OFDM symbol is set, and an input signal is obtained; a constraint matrix is calculated according to a frequency selective fading channel characteristic; and an output signal is calculated according to the sampling point signal, the input signal, and the constraint matrix; the output signal can be obtained after the input signal is preprocessed according to the frequency selective fading channel characteristic, so that frequency selective fading has a smaller impact on transmission of an OFDM symbol obtained according to the output signal, which resolves a problem that a constraint matrix obtained according to a flat fading channel characteristic is not applicable to the OFDM symbol, thereby achieving an effect of reducing the impact of the frequency selective fading on the transmission of the OFDM symbol.

Figure 6:
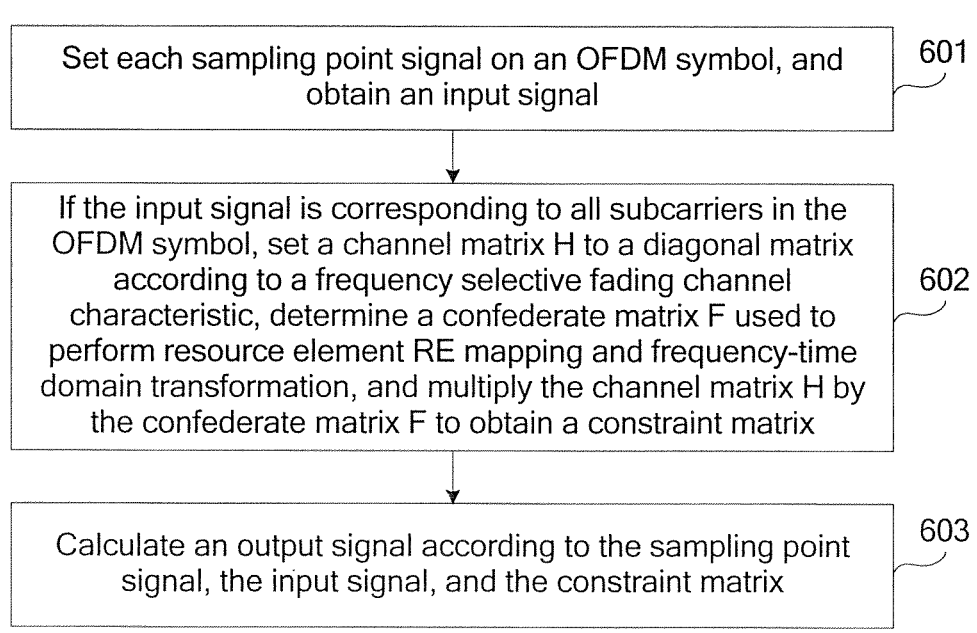
FIG. 6 is a method flowchart of a signal processing method according to another embodiment of the present invention.

Referring to FIG. 6, FIG. 6 shows a method flowchart of a signal processing method according to another embodiment of the present invention. The signal processing method includes the following steps:

Step 601: Set each sampling point signal on an OFDM symbol, and obtain an input signal.

For each OFDM symbol, a transmit end performs sampling on the OFDM symbol according to a preset sampling period, so as to obtain sampling points on all subcarriers. In this embodiment, the transmit end further needs to initialize the sampling points on all the subcarriers, that is, set a time-domain signal at each sampling point to 0 to obtain a sampling point signal. A process of performing sampling on the OFDM symbol is a conventional process, and details are not described herein in this embodiment.

The transmit end may further obtain an input modulation symbol, and determine the modulation symbol as the input signal. It is assumed that in a MIMO system, a total quantity of user antennas is M, and a data stream is mapped onto M layers after layer mapping is performed; then an obtained input signal $s=[s_{0,0} \ s_{0,1} \ \cdots \ s_{0,M-1} \ \cdots \ s_{W-1,0} \ s_{W-1,1} \ \cdots \ s_{W-1,M-1}]^T$, where $s_{W-1,M-1}$ represents the $M^{th}$ modulation symbol on the $W^{th}$ subcarrier.

Step 602: If the input signal is corresponding to all subcarriers in the OFDM symbol, set a channel matrix H to a diagonal matrix according to a frequency selective fading channel characteristic, determine a confederate matrix F used to perform resource element RE mapping and frequency-time domain transformation, and multiply the channel matrix H by the confederate matrix F to obtain a constraint matrix.

The constraint matrix in this embodiment is a matrix used to preprocess the input signal. Because frequency selective fading has a larger impact on the OFDM symbol in a transmission process, signals that are on some frequency and are received by a receive end are enhanced, and signals on some frequency are weakened, which causes severe interference between OFDM symbols. Therefore, the transmit end can calculate a proper constraint matrix according to the frequency selective fading channel characteristic, and reduce the interference between the OFDM symbols by using the constraint matrix.

Preprocessing the input signal by the transmit end includes three processes, precoding, RE mapping, and frequency-time domain transformation, respectively; therefore, a general procedure for preprocessing the input signal by the transmit end is as follows: The transmit end performs precoding on the input signal, performs RE mapping on a precoded output signal obtained after the precoding, and transforms a frequency-domain signal, obtained after the RE mapping, into a time-domain signal to obtain the output signal. However, the foregoing processing separately performed on the input signal causes a relatively long preprocessing procedure of the input signal, thereby reducing processing efficiency of the input signal. Therefore, one preferred solution is that the transmit end combines precoding, RE mapping, and frequency-time domain transformation to calculate a constraint matrix after the combination; and by using the constraint matrix, implements completing the foregoing preprocessing procedure by performing one operation process, which improves the processing efficiency. Specifically, the transmit end may calculate the constraint matrix separately according to an objective of each processing process.

First, an objective of precoding is to eliminate interference between OFDM symbols in a frequency selective fading case; and then the transmit end may set the channel matrix H according to the frequency selective fading channel characteristic.

Specifically, the interference between the OFDM symbols is relatively low when $s_{w-1}=H_{w-1} \cdot x_{w-1}$ is satisfied, where $s_{w-1}$ represents an input signal on the $w^{th}$ subcarrier, $H_{w-1}$ represents a channel matrix on the $w^{th}$ subcarrier, and $x_{w-1}$ represents a precoded output signal obtained after precoding is performed on the $w^{th}$ subcarrier. Therefore, when the transmit end calculates the precoded output signal $x_{w-1}$ on the $w^{th}$ subcarrier, only the channel matrix $H_{w-1}$ on the $w^{th}$ subcarrier needs to be reserved, and other elements in the $w^{th}$ row in the channel matrix H are set to 0; in this case, it may be obtained that the channel matrix $$H = \begin{bmatrix} H_0 & & & \\ & H_1 & & \\ & & \ddots & \\ & & & H_{W-1} \end{bmatrix}.$$

Second, an objective of RE mapping is to map a frequency-domain signal on a subcarrier to a corresponding subcarrier in a physical resource block, and an objective of frequency-time domain transformation is to transform the frequency-domain signal into a time-domain signal; and then an operation matrix used to perform frequency-time domain transformation is set according to a mapping sequence.

Specifically, the determining a confederate matrix F used to perform resource element RE mapping and frequency-time domain transformation includes:

obtaining an operation matrix used to perform frequency-time domain transformation; and rearranging, according to a mapping sequence of RE mapping, operation factors in an operation element of the operation matrix to obtain the confederate matrix F.

The transmit end may obtain the operation matrix used to perform frequency-time domain transformation, and rearrange the operation factors in the operation element of the operation matrix to obtain the confederate matrix F, so that an output signal obtained by multiplying the precoded output signal by the confederate matrix F is a time-domain signal mapped to a corresponding subcarrier in a physical resource block.

The confederate matrix $$F = \begin{bmatrix} F_{0,0} & F_{0,1} & \cdots & F_{0,W-1} \\ F_{1,0} & F_{1,1} & \cdots & F_{1,W-1} \\ \vdots & \vdots & \ddots & \vdots \\ F_{W-1,0} & F_{W-1,1} & \cdots & F_{W-1,W-1} \end{bmatrix}.$$

Because s=HFa=HX, where s is an input signal, C is a constraint matrix, a is an output signal in a time domain, H is a channel matrix, X is a frequency-domain signal, and F is a confederate matrix; and it is assumed that $s=[s_{0,0} \, s_{0,1} \, \ldots \, s_{0,M-1} \, \ldots \, s_{W-1,0} \, s_{W-1,1} \, \ldots \, s_{W-1,M-1}]^T$, $a=[x_{0,0} \, x_{0,1} \, \ldots \, x_{0,N-1} \, \ldots \, x_{W-1,0} \, x_{W-1,1} \, \ldots \, x_{W-1,N-1}]^T$, and $X=[X_{0,0} \, X_{0,1} \, \ldots \, X_{0,M-1} \, \ldots \, X_{W-1,0} \, X_{W-1,1} \, \ldots \, X_{W-1,M-1}]^T$, the above three equations are substituted into s=HFa=HX to obtain:

$$\begin{bmatrix} s_{0,0} \\ s_{0,1} \\ \vdots \\ s_{0,M-1} \\ \vdots \\ s_{W-1,0} \\ s_{W-1,1} \\ \vdots \\ s_{W-1,M-1} \end{bmatrix} = \begin{bmatrix} H_0 & & & \\ & H_1 & & \\ & & \ddots & \\ & & & H_{W-1} \end{bmatrix} \tag{1}$$

$$\begin{bmatrix} F_{0,0} & F_{0,1} & \cdots & F_{0,W-1} \\ F_{1,0} & F_{1,1} & \cdots & F_{1,W-1} \\ \vdots & \vdots & \ddots & \vdots \\ F_{W-1,0} & F_{W-1,1} & \cdots & F_{W-1,W-1} \end{bmatrix} \begin{bmatrix} x_{0,0} \\ x_{0,1} \\ \vdots \\ x_{0,N-1} \\ \vdots \\ x_{W-1,0} \\ x_{W-1,1} \\ \vdots \\ x_{W-1,N-1} \end{bmatrix};$$

-continued $$\begin{bmatrix} s_{0,0} \\ s_{0,1} \\ \vdots \\ s_{0,M-1} \\ \vdots \\ s_{W-1,0} \\ s_{W-1,1} \\ \vdots \\ s_{W-1,M-1} \end{bmatrix} = \begin{bmatrix} H_0 & & & \\ & H_1 & & \\ & & \ddots & \\ & & & H_{W-1} \end{bmatrix} \begin{bmatrix} X_{0,0} \\ X_{0,1} \\ \vdots \\ X_{0,N-1} \\ \vdots \\ X_{W-1,0} \\ X_{W-1,1} \\ \vdots \\ X_{W-1,N-1} \end{bmatrix} \quad (2)$$

Formula (1) and formula (2) may be combined to obtain:

$$\begin{bmatrix} X_{0,0} \\ X_{0,1} \\ \vdots \\ X_{0,N-1} \\ \vdots \\ X_{W-1,0} \\ X_{W-1,1} \\ \vdots \\ X_{W-1,W-1} \end{bmatrix} = \begin{bmatrix} F_{0,0} & F_{0,1} & \cdots & F_{0,W-1} \\ F_{1,0} & F_{1,1} & \cdots & F_{1,W-1} \\ \vdots & \vdots & \ddots & \vdots \\ F_{W-1,0} & F_{W-1,1} & \cdots & F_{W-1,W-1} \end{bmatrix} \begin{bmatrix} x_{0,0} \\ x_{0,1} \\ \vdots \\ x_{0,N-1} \\ \vdots \\ x_{W-1,0} \\ x_{W-1,1} \\ \vdots \\ x_{W-1,N-1} \end{bmatrix}$$

In addition, a result of frequency-time domain transformation is $$X_{0,0} = \frac{N_{\mathit{fft}}}{\sqrt{W}} \cdot W_{N_{\mathit{fft}}}^{0,0} \cdot x_{0,0} + \frac{N_{\mathit{fft}}}{\sqrt{W}} \cdot W_{N_{\mathit{fft}}}^{0,1} \cdot x_{1,0} + \ldots + \frac{N_{\mathit{fft}}}{\sqrt{W}} \cdot W_{N_{\mathit{fft}}}^{0,W-1} \cdot x_{W-1,0};$$

therefore, the transmit end needs to set each operation element in the confederate matrix F to a diagonal matrix.

For example, $$F_{m,n} = \frac{N_{\mathit{fft}}}{\sqrt{W}} \begin{bmatrix} W_{N_{\mathit{fft}}}^{m,n} & & & \\ & W_{N_{\mathit{fft}}}^{m,n} & & \\ & & \ddots & \\ & & & W_{N_{\mathit{fft}}}^{m,n} \end{bmatrix},$$

and $W_{N_{\mathit{fft}}}^{m,n} = (e^{-2\pi i/(W-1)})^{m*n}$; where $F_{m,n}$ is an operation element of the $m^{th}$ user antenna on the $n^{th}$ base station transmit antenna, $W_{N_{\mathit{fft}}}^{m,n}$ is an operation factor of $F_{m,n}$, $N_{\mathit{fft}}$ is a quantity of points of FFT (Fast Fourier Transform, fast Fourier transform), where $0 \le m \le M-1$, M is a total quantity of user antennas, $0 \le n \le N-1$, N is a total quantity of base station transmit antennas, and w is a total quantity of subcarriers. Both $N_{\mathit{fft}}$ and $W_{N_{\mathit{fft}}}^{m,n}$ can be obtained through calculation by using a conventional procedure, and details are not described herein in this embodiment.

Step 603: Calculate an output signal according to the sampling point signal, the input signal, and the constraint matrix.

The transmit end calculates the output signal according to the sampling point signal, the input signal, and the constraint matrix, further adds a CP to the output signal to form an OFDM time-domain signal, and sends the OFDM time-domain signal.

The calculating an output signal according to the sampling point signal, the input signal, and the constraint matrix includes:

calculating the sampling point signal, the input signal, and the constraint matrix to obtain a first intermediate variable;

calculating a PAR threshold of a peak clipping operation according to the first intermediate variable, and calculating a second intermediate variable according to the threshold; and if a current quantity of iteration times does not reach a preset iteration threshold, calculating a third intermediate variable according to the second intermediate variable, determining the third intermediate variable as the sampling point signal, and re-performing the step of calculating the sampling point signal, the input signal, and the constraint matrix to obtain a first intermediate variable; or if a current quantity of iteration times reaches a preset iteration threshold and the input signal is corresponding to all the subcarriers in the OFDM symbol, determining the second intermediate variable as the output signal.

In this embodiment, it is assumed that the sampling point signal $x_0 = 0_{N \times 1}$, $y_1 = x_0$, $t_1 = 1$, and $L = 2\sigma^2_{max}(C)$, where $\sigma_{max}(C)$ is a maximum singular value of the constraint matrix C, $C^H$ is a conjugate transpose of the constraint matrix C, $C^H$ is the input signal, a quantity of iteration times $k=1, 2, \ldots, K$ and an iteration threshold is K; then a specific algorithm is as follows:

Step 1: Calculate the first intermediate variable w according to $$w = y_k - \frac{2}{L} C^H (C y_K - s).$$

Step 2: Calculate the PAR threshold $\alpha$ according to $$\alpha = \mathrm{argmin}_\alpha \left\{ \lambda \alpha + \frac{2}{L} \sum_{i=1}^{N} ([|[w]_i| - \alpha]^+)^2 \right\}.$$

Step 3: Calculate the second intermediate variable $x_k$ according to $x_k$ trunc$_\alpha$ (w).

Step 4: If the current quantity of iteration times k<K, calculate $t_{k+1}$ according to $$t_{k+1} = \frac{1}{2}\left(1 + \sqrt{1 + 4 \times t_k^2}\right),$$

and calculate the third intermediate variable $y_{k+1}$ according to $$y_{k+1} = x_k + \frac{t_k - 1}{t_{k+1}}(x_k - x_{k-1});$$

determine $y_{k+1}$ as $y_k$, and continue to perform step 1.

Step 5: If the current quantity of iteration times k=K and s is corresponding to all the subcarriers in the OFDM symbol, determine the second intermediate variable $x_k$ as the output signal.

In conclusion, in the signal processing method provided in this embodiment of the present invention, each sampling point signal on an OFDM symbol is set, and an input signal is obtained; a constraint matrix is calculated according to a frequency selective fading channel characteristic; and an output signal is calculated according to the sampling point signal, the input signal, and the constraint matrix; the output signal can be obtained after the input signal is preprocessed according to the frequency selective fading channel characteristic, so that frequency selective fading has a smaller impact on transmission of an OFDM symbol obtained according to the output signal, which resolves a problem that a constraint matrix obtained according to a flat fading channel characteristic is not applicable to the OFDM symbol, thereby achieving an effect of reducing the impact of the frequency selective fading on the transmission of the OFDM symbol.

In addition, a channel matrix H is set to a diagonal matrix according to the frequency selective fading channel characteristic, a confederate matrix F used to perform resource element RE mapping and frequency-time domain transformation is determined, and the constraint matrix is obtained by multiplying the channel matrix H by the confederate matrix F; in this way, precoding, RE mapping, and frequency-time domain transformation can be combined to directly calculate the output signal according to the constraint matrix, and there is no need to separately perform preprocessing, RE mapping, and frequency-time domain transformation on the input signal, which simplifies a processing procedure of the OFDM symbol and improves processing efficiency.

Figure 7:
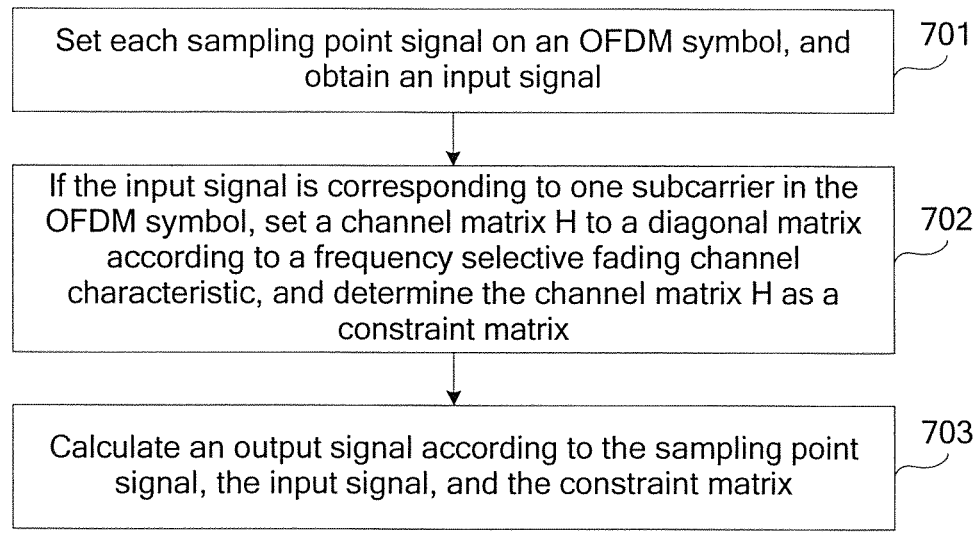
FIG. 7 is a method flowchart of a signal processing method according to still another embodiment of the present invention.

Referring to FIG. 7, FIG. 7 shows a method flowchart of a signal processing method according to still another embodiment of the present invention. The signal processing method includes the following steps:

Step 701: Set each sampling point signal on an OFDM symbol, and obtain an input signal.

For each OFDM symbol, a transmit end performs sampling on the OFDM symbol according to a preset sampling period, so as to obtain a sampling point on a single subcarrier. In this embodiment, the transmit end further needs to initialize each sampling point on the single subcarrier, that is, set a time-domain signal at each sampling point to 0 to obtain a sampling point signal. A process of performing sampling on the OFDM symbol is a conventional process, and details are not described herein in this embodiment.

The transmit end may further obtain an input modulation symbol, and determine the modulation symbol as the input signal. It is assumed that in a MIMO system, a total quantity of user antennas is M, and a data stream is mapped onto M layers after layer mapping is performed; then an obtained input signal $s=[s_{W-1,0}\ s_{W-1,1}\ \cdots\ s_{W-1,M-1}]$, where $s_{W-1,M-1}$ represents the $M^{th}$ modulation symbol on the $W^{th}$ subcarrier.

Step 702: If the input signal is corresponding to one subcarrier in the OFDM symbol, set a channel matrix H to a diagonal matrix according to a frequency selective fading channel characteristic, and determine the channel matrix H as a constraint matrix.

The constraint matrix in this embodiment is a matrix used to preprocess the input signal. Because frequency selective fading has a larger impact on the OFDM symbol in a transmission process, signals that are on some frequency and are received by a receive end are enhanced, and signals on some frequency are weakened, which causes severe interference between OFDM symbols. Therefore, the transmit end can calculate a proper constraint matrix according to the frequency selective fading channel characteristic, and reduce the interference between the OFDM symbols by using the constraint matrix.

Preprocessing the input signal by the transmit end includes three processes, precoding, RE mapping, and frequency-time domain transformation, respectively; if precoding, RE mapping, and frequency-time domain transformation are combined to calculate a constraint matrix after the combination, the constraint matrix is relatively complexed in this case, although completing the foregoing preprocessing procedure by performing one operation process is implemented by using the constraint matrix, and processing efficiency is improved. Therefore, in this embodiment, precoding, RE mapping, and frequency-time domain transformation are separately performed on the signal. That is, the transmit end performs precoding on the input signal, performs RE mapping on a precoded output signal obtained after the precoding, and transforms a frequency-domain signal, obtained after the RE mapping, into a time-domain signal to obtain an output signal, so that calculation complexity of the output signal is reduced by simplifying the constraint matrix.

In this embodiment, an objective of precoding is to eliminate interference between OFDM symbols in a frequency selective fading case; and then the transmit end may set the channel matrix H according to the frequency selective fading channel characteristic.

Specifically, the interference between the OFDM symbols is relatively low when $s_{w-1}=H_{w-1}\cdot x_{w-1}$ is satisfied, where $s_{w-1}$ represents an input signal on the $w^{th}$ subcarrier, $H_{w-1}$ represents a channel matrix on the $w^{th}$ subcarrier, and $x_{w-1}$ represents a precoded output signal obtained after precoding is performed on the $w^{th}$ subcarrier. Therefore, when the transmit end calculates the precoded output signal $x_{w-1}$ on the $w^{th}$ subcarrier, only the channel matrix $H_{w-1}$ on the $w^{th}$ subcarrier needs to be reserved, and other elements in the $w^{th}$ row in the channel matrix H are set to 0; in this case, it may be obtained that the channel matrix $$H = \begin{bmatrix} H_0 & & & \\ & H_1 & & \\ & & \ddots & \\ & & & H_{W-1} \end{bmatrix}.$$

Step 703: Calculate an output signal according to the sampling point signal, the input signal, and the constraint matrix.

The transmit end calculates the sampling point signal, the input signal, and the constraint matrix, and performs RE mapping and frequency-time domain transformation on a result of the calculation to obtain the output signal; further adds a CP to the output signal to form an OFDM time-domain signal; and sends the OFDM time-domain signal.

The calculating an output signal according to the sampling point signal, the input signal, and the constraint matrix includes:

calculating the sampling point signal, the input signal, and the constraint matrix to obtain a first intermediate variable;

calculating a PAR threshold of a peak clipping operation according to the first intermediate variable, and calculating a second intermediate variable according to the threshold; and if a current quantity of iteration times does not reach a preset iteration threshold, calculating a third intermediate variable according to the second intermediate variable, determining the third intermediate variable as the sampling point signal, and re-performing the step of calculating the sampling point signal, the input signal, and the constraint matrix to obtain a first intermediate variable; or if a current quantity of iteration times reaches a preset iteration threshold and the input signal is corresponding to one subcarrier in the OFDM symbol, performing RE mapping and frequency-time domain transformation on the second intermediate variable to obtain the output signal.

In this embodiment, it is assumed that the sampling point signal $x_0=0_{N\times 1}$, $y_1=x_0$, $t_1=1$, and $L=2\sigma^2_{max}(C)$, where $\sigma_{max}(C)$ is a maximum singular value of a constraint matrix C, $C^H$ is a conjugate transpose of the constraint matrix C, s is the input signal, a quantity of iteration times k=1, 2, . . . , K and an iteration threshold is K; then a specific algorithm is as follows:

Step 1: Calculate the first intermediate variable w according to $$w = y_k - \frac{2}{L}C^H(Cy_K - s).$$

Step 2: Calculate the PAR threshold α according to $$\alpha = \mathrm{argmin}_\alpha\left\{\lambda\alpha + \frac{2}{L}\sum_{i=1}^{N}([|[w]_i| - \alpha]^+)^2\right\}.$$

Step 3: Calculate the second intermediate variable $x_k$ according to $x_k=\mathrm{trunc}_\alpha(w)$.

Step 4: If the current quantity of iteration times k<K, calculate $t_{k+1}$ according to $$t_{k+1} = \frac{1}{2}\left(1 + \sqrt{1 + 4\times t_k^2}\right),$$

and calculate the third intermediate variable $y_{k+1}$ according to $$y_{k+1} = x_k + \frac{t_k - 1}{t_{k+1}}(x_k - x_{k-1});$$

determine $y_{k+1}$ as $y_k$, and continue to perform step 1.

Step 5: If the current quantity of iteration times k=K and s is corresponding to one subcarrier in the OFDM symbol, perform RE mapping and frequency-time domain transformation on the second intermediate variable $x_k$ to obtain the output signal.

Specifically, the performing RE mapping and frequency-time domain transformation on the second intermediate variable to obtain the output signal includes:

arranging the second intermediate variable according to a mapping sequence of RE mapping; and multiplying an arranged second intermediate variable by an operation matrix used to perform frequency-time domain transformation, to obtain the output signal.

The transmit end may arrange the second intermediate variable according to the mapping sequence of RE mapping, so as to implement mapping the second intermediate variable to a corresponding subcarrier in a physical resource block. The second intermediate variable is a frequency-domain signal; therefore, the transmit end further needs to multiply the arranged second intermediate variable by the operation matrix used to perform frequency-time domain transformation, so as to transform the second intermediate variable from a frequency-domain signal into a time-domain signal, and obtain the output signal. The performing RE mapping and frequency-time domain transformation on the second intermediate variable is a conventional procedure, and details are not described herein in this embodiment.

In conclusion, in the signal processing method provided in this embodiment of the present invention, each sampling point signal on an OFDM symbol is set, and an input signal is obtained; a constraint matrix is calculated according to a frequency selective fading channel characteristic; and an output signal is calculated according to the sampling point signal, the input signal, and the constraint matrix; the output signal can be obtained after the input signal is preprocessed according to the frequency selective fading channel characteristic, so that frequency selective fading has a smaller impact on transmission of an OFDM symbol obtained according to the output signal, which resolves a problem that a constraint matrix obtained according to a flat fading channel characteristic is not applicable to the OFDM symbol, thereby achieving an effect of reducing the impact of the frequency selective fading on the transmission of the OFDM symbol.

In addition, a second intermediate variable is arranged according to a mapping sequence of RE mapping, and an arranged second intermediate variable is multiplied by an operation matrix used to perform frequency-time domain transformation, to obtain the output signal; in this way, an output signal on each subcarrier in the OFDM symbol can be separately calculated, thereby reducing calculation complexity of the output signal by simplifying the constraint matrix.

It should be noted that, during signal processing by the signal processing apparatus provided in the foregoing embodiments, description is given only by using division of the foregoing function modules. In actual application, the foregoing functions may be allocated to different function modules for implementation as required, that is, an internal structure of the signal processing apparatus is divided into different function modules to implement all or a part of the functions described above. In addition, the signal processing apparatus provided in the foregoing embodiments and the signal processing method embodiments pertain to a same concept; for a specific implementation process of the signal processing apparatus, refer to the method embodiments, and details are not described herein.

The sequence numbers of the foregoing embodiments of the present invention are merely for illustrative purposes, and are not intended to indicate priorities of the embodiments.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, an optical disc, or the like.

The foregoing descriptions are merely exemplary embodiments of the present invention, but are not intended to limit the present invention. Any modification, equivalent replacement, and improvement made without departing from the spirit and principle of the present invention shall fall within the protection scope of the present invention.

What is claimed is:
1. A signal processing apparatus comprising:
a processor; and
a memory storing a plurality of computer executable instructions which, when executed by the processor, cause the apparatus to:

set each sampling point signal on an orthogonal frequency division multiplexing OFDM symbol, to obtain an input signal;
calculate a constraint matrix according to a frequency selective fading channel characteristic;
calculate an output signal according to the sampling point signal, the input signal, and the constraint matrix;
when the input signal corresponds to all subcarriers in the OFDM symbol, set a channel matrix H to a diagonal matrix according to the frequency selective fading channel characteristic, determine a confederate matrix F used to perform resource element (RE) mapping and frequency-time domain transformation, and multiply the channel matrix H by the confederate matrix F to obtain the constraint matrix; or
when the input signal corresponds to one subcarrier in the OFDM symbol, set a channel matrix H to a diagonal matrix according to the frequency selective fading channel characteristic, and determine the channel matrix H as the constraint matrix.

2. The apparatus according to claim 1, wherein the computer executable instructions, when executed by the processor, cause the apparatus to:
obtain an operation matrix used to perform frequency-time domain transformation; and
rearrange, according to a mapping sequence of RE mapping, operation factors in an operation element of the operation matrix to obtain the confederate matrix F.

3. The apparatus according to claim 1, wherein:
the channel matrix comprises $$H = \begin{bmatrix} H_0 & & & \\ & H_1 & & \\ & & \ddots & \\ & & & H_{W-1} \end{bmatrix},$$

wherein $H_{W-1}$ is a channel matrix on the $w^{th}$ subcarrier, and w is a total quantity of subcarriers;
the confederate matrix comprises $$F = \begin{bmatrix} F_{0,0} & F_{0,1} & \ldots & F_{0,W-1} \\ F_{1,0} & F_{1,1} & \ldots & F_{1,W-1} \\ \vdots & \vdots & \ddots & \vdots \\ F_{W-1,0} & F_{W-1,1} & \ldots & F_{W-1,W-1} \end{bmatrix}; \text{ and}$$

$$F_{m,n} = \frac{N_{ff}}{\sqrt{W}} \begin{bmatrix} W_{N_{ff}}^{m,n} & & & \\ & W_{N_{ff}}^{m,n} & & \\ & & \ddots & \\ & & & W_{N_{ff}}^{m,n} \end{bmatrix},$$

and $W_{N_{ff}}^{m,n} = (e^{-2\pi i/(W-1)})^{m*n}$; wherein
$F_{m,n}$ is an operation element of the $m^{th}$ user antenna on the $n^{th}$ base station transmit antenna, $W_{N}^{m,n}$ is an operation factor of $F_{m,n}$, $N_{ff}$ is a quantity of points of fast Fourier transform FFT, wherein 0≤m≤M−1, M is a total quantity of user antennas, 0≤n≤N−1, and N is a total quantity of base station transmit antennas.

4. The apparatus according to claim 1, wherein the computer executable instructions, when executed by the processor, cause the apparatus to:
calculate the sampling point signal, the input signal, and the constraint matrix to obtain a first intermediate variable;
calculate a peak-to-average ratio (PAR) threshold of a peak clipping operation according to the first intermediate variable, and calculate a second intermediate variable according to the threshold; and
when a current quantity of iteration times does not reach a preset iteration threshold, calculate a third intermediate variable according to the second intermediate variable, determine the third intermediate variable as the sampling point signal, and re-perform the operation of calculating the sampling point signal, the input signal, and the constraint matrix to obtain a first intermediate variable, or
when a current quantity of iteration times reaches a preset iteration threshold and the input signal corresponds to all the subcarriers in the OFDM symbol, determine the second intermediate variable as the output signal, or
when a current quantity of iteration times reaches a preset iteration threshold and the input signal corresponds to one subcarrier in the OFDM symbol, perform RE mapping and frequency-time domain transformation on the second intermediate variable to obtain the output signal.

5. The apparatus according to claim 4, wherein the computer executable instructions, when executed by the processor, cause the apparatus to:
arrange the second intermediate variable according to a mapping sequence of RE mapping; and
multiply an arranged second intermediate variable by the operation matrix used to perform frequency-time domain transformation, to obtain the output signal.

6. A signal processing method, comprising:
setting each sampling point signal on an orthogonal frequency division multiplexing OFDM symbol, to obtain an input signal;
calculating a constraint matrix according to a frequency selective fading channel characteristic; and
calculating an output signal according to the sampling point signal, the input signal, and the constraint matrix;
wherein calculating the constraint matrix according to the frequency selective fading channel characteristic comprises:
when the input signal corresponds to all subcarriers in the OFDM symbol, setting a channel matrix H to a diagonal matrix according to the frequency selective fading channel characteristic, determining a confederate matrix F used to perform resource element (RE) mapping and frequency-time domain transformation, and multiplying the channel matrix H by the confederate matrix F to obtain the constraint matrix; or
when the input signal corresponds to one subcarrier in the OFDM symbol, setting a channel matrix H to a diagonal matrix according to the frequency selective fading channel characteristic, and determining the channel matrix H as the constraint matrix.

7. The method according to claim 6, wherein determining the confederate matrix F used to perform resource element RE mapping and frequency-time domain transformation comprises:
obtaining an operation matrix used to perform frequency-time domain transformation; and
rearranging, according to a mapping sequence of RE mapping, operation factors in an operation element of the operation matrix to obtain the confederate matrix F.

8. The method according to claim 6, wherein:
the channel matrix comprises $$H = \begin{bmatrix} H_0 & & & \\ & H_1 & & \\ & & \ddots & \\ & & & H_{W-1} \end{bmatrix},$$

wherein $H_{W-1}$ is a channel matrix on the $w^{th}$ subcarrier, and w is a total quantity of subcarriers;
the confederate matrix comprises $$F = \begin{bmatrix} F_{0,0} & F_{0,1} & \cdots & F_{0,W-1} \\ F_{1,0} & F_{1,1} & \cdots & F_{1,W-1} \\ \vdots & \vdots & \ddots & \vdots \\ F_{W-1,0} & F_{W-1,1} & \cdots & F_{W-1,W-1} \end{bmatrix}; \text{ and}$$

$$F_{m,n} = \frac{N_{\mathit{fft}}}{\sqrt{W}} \begin{bmatrix} W_{N_{\mathit{fft}}}^{m,n} & & & \\ & W_{N_{\mathit{fft}}}^{m,n} & & \\ & & \ddots & \\ & & & W_{N_{\mathit{fft}}}^{m,n} \end{bmatrix},$$

and $W_{N_{\mathit{fft}}}^{m,n} = (e^{-2\pi i/(W-1)})^{m*n}$; wherein $F_{m,n}$ is an operation element of the $m^{th}$ user antenna on the $n^{th}$ base station transmit antenna, $W_{N_{\mathit{fft}}}^{m,n}$ is an operation factor of $F_{m,n}$, $N_{\mathit{fft}}$ is a quantity of points of fast Fourier transform FFT, wherein $0 \le m \le M-1$, M is a total quantity of user antennas, $0 \le n \le N-1$, and N is a total quantity of base station transmit antennas.

9. The method according to claim 6, wherein calculating the output signal according to the sampling point signal, the input signal, and the constraint matrix comprises:

calculating the sampling point signal, the input signal, and the constraint matrix to obtain a first intermediate variable;

calculating a peak-to-average ratio (PAR) threshold of a peak clipping operation according to the first intermediate variable, and calculating a second intermediate variable according to the threshold; and when a current quantity of iteration times does not reach a preset iteration threshold, calculating a third intermediate variable according to the second intermediate variable, determining the third intermediate variable as the sampling point signal, and re-performing the step of calculating the sampling point signal, the input signal, and the constraint matrix to obtain a first intermediate variable, or when a current quantity of iteration times reaches a preset iteration threshold and the input signal corresponds to all the subcarriers in the OFDM symbol, determining the second intermediate variable as the output signal, or when a current quantity of iteration times reaches a preset iteration threshold and the input signal corresponds to one subcarrier in the OFDM symbol, performing RE mapping and frequency-time domain transformation on the second intermediate variable to obtain the output signal.

10. The method according to claim 9, wherein performing the RE mapping and frequency-time domain transformation on the second intermediate variable to obtain the output signal comprises:

arranging the second intermediate variable according to a mapping sequence of RE mapping; and multiplying an arranged second intermediate variable by the operation matrix used to perform frequency-time domain transformation, to obtain the output signal.

* * * * *